(12) United States Patent
Kwag et al.

(10) Patent No.: US 11,423,832 B2
(45) Date of Patent: Aug. 23, 2022

(54) METHOD OF GENERATING COMPENSATION DATA OF DISPLAY DEVICE AND APPARATUS FOR GENERATING COMPENSATION DATA OF DISPLAY DEVICE

(71) Applicant: Samsung Display Co., LTD., Yongin-si (KR)

(72) Inventors: Dong Joon Kwag, Yongin-si (KR); Hyung Jin Kim, Seoul (KR); Seok Ha Hong, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/394,966

(22) Filed: Aug. 5, 2021

(65) Prior Publication Data
US 2022/0084459 A1 Mar. 17, 2022

(30) Foreign Application Priority Data

Sep. 16, 2020 (KR) .................. 10-2020-0118890

(51) Int. Cl.
*G09G 3/32* (2016.01)
*G01J 1/42* (2006.01)

(52) U.S. Cl.
CPC .............. *G09G 3/32* (2013.01); *G01J 1/4228* (2013.01); *G01J 2001/4252* (2013.01);
(Continued)

(58) Field of Classification Search
CPC ... G09G 2300/0842; G09G 2310/0267; G09G 2300/0426; G09G 3/32; G09G 2310/0275;
(Continued)

(56) References Cited

U.S. PATENT DOCUMENTS 8,094,143 B2   1/2012 Kamada et al.
8,300,051 B2   10/2012 Kim et al.
(Continued)

FOREIGN PATENT DOCUMENTS

CN   103531175   8/2016
CN   107358935   11/2017
(Continued)

OTHER PUBLICATIONS

International Search Report corresponding to International Application No. PCT/KR2021/012579 dated Dec. 16, 2021.
(Continued)

*Primary Examiner* — Muhammad N Edun
(74) *Attorney, Agent, or Firm* — Kile Park Reed & Houtteman PLLC

(57) ABSTRACT

A method of generating compensation data in a display device includes setting a pixel group including a first target pixel and first non-target pixels adjacent to the first target pixel among a plurality of pixels of a display panel; switching on the first target pixel and switching off the first non-target pixels to generate a first captured image and store the first captured image; switching on the first target pixel and the first non-target pixels to generate a second captured image and store the second captured image; switching off the first target pixel and switching on the first non-target pixels to generate a third captured image and store the third captured image; and calculating luminance correction data of the first target pixel based on the stored first to third captured images.

20 Claims, 19 Drawing Sheets

(52) U.S. Cl.
CPC ............ *G09G 2300/0426* (2013.01); *G09G 2300/0842* (2013.01); *G09G 2310/0267* (2013.01); *G09G 2310/0275* (2013.01); *G09G 2310/08* (2013.01); *G09G 2320/0233* (2013.01); *G09G 2360/16* (2013.01)

(58) Field of Classification Search
CPC ....... G09G 2320/0233; G09G 2360/16; G09G 2310/08; G01J 1/4228; G01J 2001/4252
See application file for complete search history.

(56) References Cited

U.S. PATENT DOCUMENTS

| | | | |
|---|---|---|---|
| 8,958,640 B1* | 2/2015 | McNerney | H04N 9/73 |
| | | | 382/167 |
| 2011/0150349 A1* | 6/2011 | Kojima | G06T 5/20 |
| | | | 382/224 |
| 2011/0169853 A1* | 7/2011 | Oiwa | G06T 11/203 |
| | | | 345/589 |
| 2015/0116387 A1 | 4/2015 | Jun et al. | |
| 2019/0333459 A1* | 10/2019 | Chen | G09G 3/3611 |

FOREIGN PATENT DOCUMENTS

| | | |
|---|---|---|
| KR | 10-2010-0039664 | 4/2010 |
| KR | 10-2015-0048394 | 5/2015 |
| KR | 10-2017-0066772 | 6/2017 |
| KR | 10-2020-0082347 | 7/2020 |

OTHER PUBLICATIONS

Written Opinion corresponding to International Application No. PCT/KR2021/012579 dated Dec. 16, 2021.

* cited by examiner

METHOD OF GENERATING COMPENSATION DATA OF DISPLAY DEVICE AND APPARATUS FOR GENERATING COMPENSATION DATA OF DISPLAY DEVICE

CROSS REFERENCE TO RELATED APPLICATION(S)

This application claims priority from Korean Patent Application No. 10-2020-0118890, filed on Sep. 16, 2020, in the Korean Intellectual Property Office, the disclosure of which is incorporated herein by reference in its entirety.

BACKGROUND

1. Technical Field

The disclosure relates to a method of generating compensation data of a display device, and an apparatus for generating compensation data of a display device.

2. Description of the Related Art

In general, a display device includes a display panel and a driving unit. The display panel includes scan lines, data lines, and pixels. The driving unit includes a scan driver that supplies a scan output signal to the scan lines and a data driver that supplies a data voltage to the data lines.

Generally, the pixel includes transistors, storage capacitors, and organic light emitting diodes. A difference in luminance between pixels occurs due to a deviation between pixels (for example, a deviation of a threshold voltage of a driving transistor), the difference in luminance is visually recognized as a spot, resulting in poor quality of the display device.

Accordingly, it is necessary to acquire accurate luminance information of individual pixels such as luminance correction data of individual pixels in order to compensate for luminance differences between pixels, but it may be difficult to acquire accurate luminance information of individual pixels by the lenses of a photographing apparatus.

SUMMARY

An aspect of the disclosure is to provide a method of generating compensation data of a display device capable of calculating accurate luminance correction data of individual pixels.

Another aspect of the disclosure is to provide an apparatus for generating compensation data of a display device capable of calculating accurate luminance correction data of individual pixels.

According to an embodiment, a method of generating compensation data in a display device, the method may comprise setting a first pixel group including a first target pixel and first non-target pixels adjacent to the first target pixel among a plurality of pixels of a display panel; switching on the first target pixel and switching off the first non-target pixels to generate a first captured image and store the first captured image; switching on the first target pixel and the first non-target pixels to generate a second captured image and store the second captured image; switching off the first target pixel and switching on the first non-target pixels to generate a third captured image and store the third captured image; and calculating luminance correction data of the first target pixel based on the stored first to third captured images.

The first non-target pixels may include pixels contacting the first target pixel.

The calculating of the luminance correction data of the first target pixel based on the stored first to third captured images may include calculating Equation 1 based on the first captured image, and the Equation 1 may be defined as $L(PXpq\_IM1)=L(PXpq(ORIGIN))-L(PXpq')$, wherein the PXpq is a pixel disposed at a p-th row and a q-th column of the plurality of pixels of the display panel, the p and q being natural numbers, the $L(PXpq\_IM1)$ is a luminance value of the PXpq measured from the first captured image, the $L(PXpq(ORIGIN))$ is an original luminance value of the PXpq that is not measured from the first captured image, the $L(PXpq')$ is a value of interference luminance to a periphery which should be measured as a part of the luminance value of the PXpq but is measured as a part of a luminance value of NPXpq, and the NPXpq are pixels adjacent to the PXpq.

The calculating of the luminance correction data of the first target pixel based on the stored first to third captured images may include calculating Equation 2 based on the second captured image, and the Equation 2 may be defined as $L(PXpq\_IM2)=L(PXpq(ORIGIN))+L(NPXpq')-L(PXpq')$, wherein the $L(PXpq\_IM2)$ is a luminance value of the PXpq measured from the second captured image, and the $L(NPXpq')$ is a value of an interference luminance by the periphery which should be measured as a part of the luminance value of the NPXpq but is measured as a part of the luminance value of the PXpq.

The calculating of the luminance correction data of the first target pixel based on the stored first to third captured images may include calculating Equation 3 based on the third captured image, and the Equation 3 may be defined as $L(PXpq\_IM3)=L(NPXpq')$, wherein the $L(PXpq\_IM3)$ is a luminance value of the PXpq measured from the third captured image).

The $L(PXpq(ORIGIN))$, $L(NPXpq')$, and $L(PXpq')$ may be calculated through the Equations 1 to 3.

The luminance correction data of the first target pixel may be calculated based on the calculated $L(PXpq(ORIGIN))$.

The method may further comprise setting one of the first non-target pixels as a second target pixel and setting pixels contacting the second target pixel as second non-target pixels, between the switching off of the first target pixel and switching on the first non-target pixels and the calculating of the luminance correction data of the first target pixel.

The display panel may include an inorganic light emitting diode.

The first to third captured images may be generated by a CMOS camera or a CCD camera.

The CMOS camera may represent relative luminance of the plurality of pixels.

According to another embodiment, an apparatus for generating compensation data in a display device may comprise a display panel including a plurality of pixels, the plurality of pixels including a first pixel group, the first pixel group including a first target pixel and first non-target pixels adjacent to the first target pixel, an image capturing device generating a first captured image obtained by switching on the first target pixel and switching off the first non-target pixels, a second captured image obtained by switching on the first target pixel and the first non-target pixels, and a third captured image obtained by switching off the first target pixel and switching on the first non-target pixels; a storage device storing a first captured image obtained by switching on the first target pixel and switching off the first non-target pixels, a second captured image obtained by switching on the first target pixel and the first non-target pixels, and a third captured image obtained by switching off the first target pixel and switching on the first non-target pixels; and a controller calculating luminance correction data of the first target pixel based on the first captured image to the third captured image.

The first non-target pixels may include pixels contacting the first target pixel.

The controller may calculate Equation 1 based on the first captured image, and the Equation 1 may be defined as $L(PXpq\_IM1)=L(PXpq(ORIGIN))-L(PXpq')$, wherein the PXpq is a pixel disposed at a p-th row and a q-th column of the plurality of pixels of the display panel, the p and q being natural numbers, the $L(PXpq\_IM1)$ is a luminance value of the PXpq measured from the first captured image, the $L(PXpq(ORIGIN))$ is an original luminance value of the PXpq that is not measured from the first captured image, the $L(PXpq')$ is a value of interference luminance to a periphery which should be measured as a part of a luminance value of the PXpq but is measured as a part of a luminance value of NPXpq, and the NPXpq are pixels adjacent to the PXpq.

The controller may calculate Equation 2 based on the second captured image, and the Equation 2 may be defined as $L(PXpq\_IM2)=L(PXpq(ORIGIN))+L(NPXpq')-L(PXpq')$, wherein the $L(PXpq\_IM2)$ is a luminance value of the pixel PXpq measured from the second captured image, and the $L(NPXpq')$ is a value of an interference luminance by the periphery which should be measured as a part of the luminance value of the NPXpq but is measured as a part of the luminance value of the PXpq.

The controller may calculate Equation 3 based on the third captured image, and the Equation 3 may be defined as $L(PXpq\_IM3)=L(NPXpq')$, wherein the $L(PXpq\_IM3)$ is a luminance value of the PXpq measured from the third captured image).

The controller may calculate the $L(PXpq(ORIGIN))$, $L(NPXpq')$, and $L(PXpq')$ through Equations 1 to 3.

The controller may calculate the luminance correction data of the first target pixel based on the calculated $L(PXpq(ORIGIN))$.

The display panel may include an inorganic light emitting diode.

The first captured to third captured images may be generated by a CMOS camera or a CCD camera, and the CMOS camera may represent relative luminance of the plurality of pixels.

However, aspects of the disclosure are not restricted to the one set forth herein. The above and other aspects of the disclosure will become more apparent to one of ordinary skill in the art to which the disclosure pertains by referencing the detailed description of the disclosure given below.

BRIEF DESCRIPTION OF THE DRAWINGS

The above and other aspects and features of the disclosure will become more apparent by describing in detail some embodiments thereof with reference to the attached drawings, in which.

DETAILED DESCRIPTION OF THE EMBODIMENTS

Figure 1:
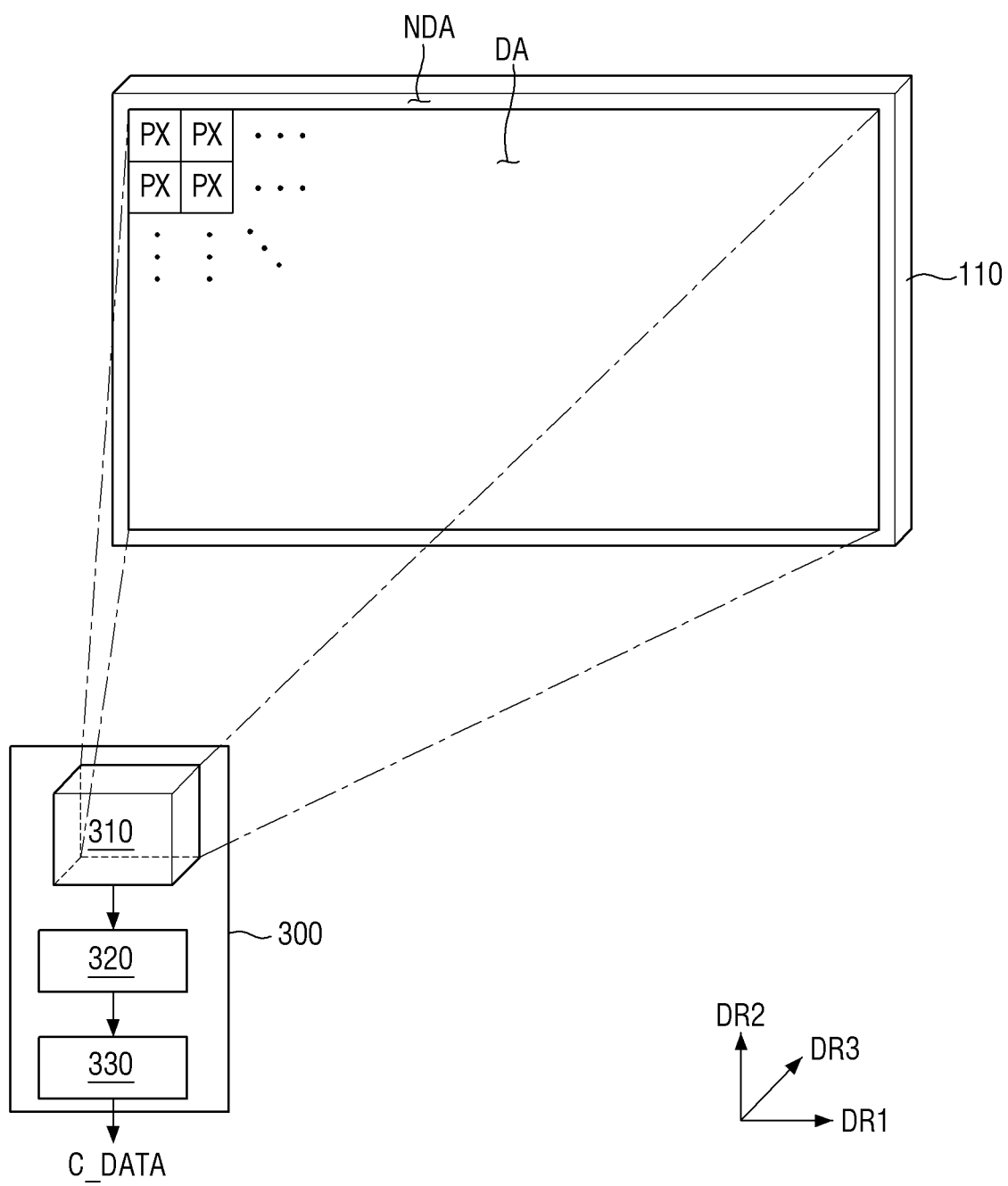
FIG. 1 is a schematic perspective view of a display panel and an apparatus for generating compensation data of a display device according to an embodiment.

Specific structural and functional descriptions of embodiments of the disclosure disclosed herein are only for illustrative purposes of the embodiments of the disclosure. The disclosure may be embodied in many different forms without departing from the spirit and significant characteristics of the disclosure. Therefore, the embodiments of the disclosure are disclosed only for illustrative purposes and should not be construed as limiting the disclosure. That is, the disclosure is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third," or the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the disclosure will be described with reference to the attached drawings.

FIG. 1 is a schematic perspective view of a display panel and an apparatus for generating compensation data of a display device according to an embodiment.

A display device according to an embodiment may display a moving image or a still image. The display device may refer to any electronic device that includes a display screen. For example, the display device may be applied to televisions, laptops, monitors, billboards, Internet of things (IoT) devices, mobile phones, smartphones, tablet personal computers (PCs), electronic clocks, smartwatches, watch phones, head-mounted displays (HMDs), mobile communication terminals, electronic notebooks, e-books, portable multimedia players (PMPs), navigation systems, game consoles, digital cameras, and camcorders, each providing a display screen. The display device according to an embodiment may be a large display device which includes a large area for a display screen.

The display device may include a display panel 110 that provides a display screen. Examples of the display panel 110 may include an inorganic light emitting display panel, an organic light emitting display panel, a micro LED display panel, a nano LED display panel, a quantum dot light emitting display panel, a liquid crystal display panel, a plasma display panel, a field emission display panel, an electrophoretic display panel, and an electrowetting display panel. Hereinafter, an embodiment where the organic light emitting display panel is applied is described as an example of the display panel 110. However, the disclosure is not limited thereto, and the same technical idea may be applied to other display panels.

As illustrated in FIG. 1, the display panel 110 may have a rectangular shape including long sides extending in a first direction DR1 and short sides extending in a second direction DR2. The edges where the long sides and short sides of the display panel 110 meet each other may be angular, but the disclosure is not limited thereto, and the edges may be rounded. However, the shape of the display panel 110 is not limited thereto, and the display panel 110 may have a shape such as a long rectangle, a square, any polygon, or a circle. The display panel 110 may include a display area DA for displaying an image and a non-display area NDA located around the display area DA. The shape of the display area DA may be substantially similar to the shape of the display panel 110. The display area DA may include pixels PX.

The pixels PX may be arranged in a matrix manner. The pixels PX may be arranged in the first direction DR1 and the second direction DR2. Each pixel PX may have, for example, a rectangular shape. However, the disclosure is not limited thereto, and each pixel PX may have the shape of a triangular, polygonal, circular, or elliptical shape. Hereinafter, for convenience of explanation, an embodiment in which the shape of the pixel PX is a square will be mainly described.

An apparatus 300 for generating compensation data of a display device according to an embodiment may calculate or produce luminance compensation data of each of the pixels PX of the display panel 110. Even if the same input image data is input to the pixels PX of the display panel 110, a deviation in luminance between the respective pixels PX may occur due to a deviation in threshold voltage between driving transistors of the respective pixels PX, a change in channel mobility, and/or deterioration of a light emitting element. Accordingly, there is a need to producing accurate luminance correction data of individual pixels PX based on luminance values of the individual pixels PX to which the same input image data is input. In an embodiment, in case that the display panel 110 has a large area, a luminance deviation for each pixel PX may be great, and thus this need may increase.

Figure 6:
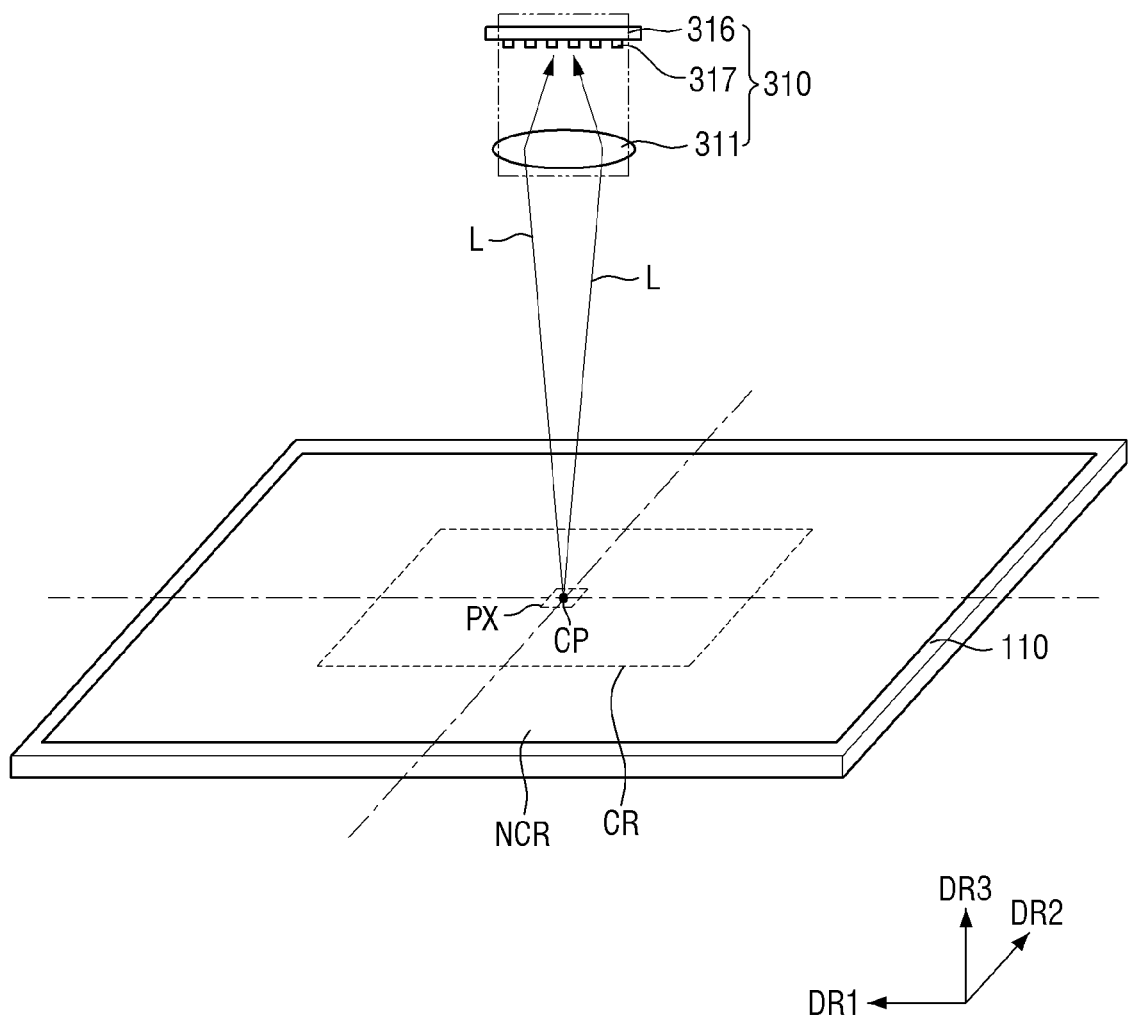
FIG. 6 is a schematic perspective view illustrating the photographing of pixels of a display panel through a photographing unit according to an embodiment.
Figure 7:
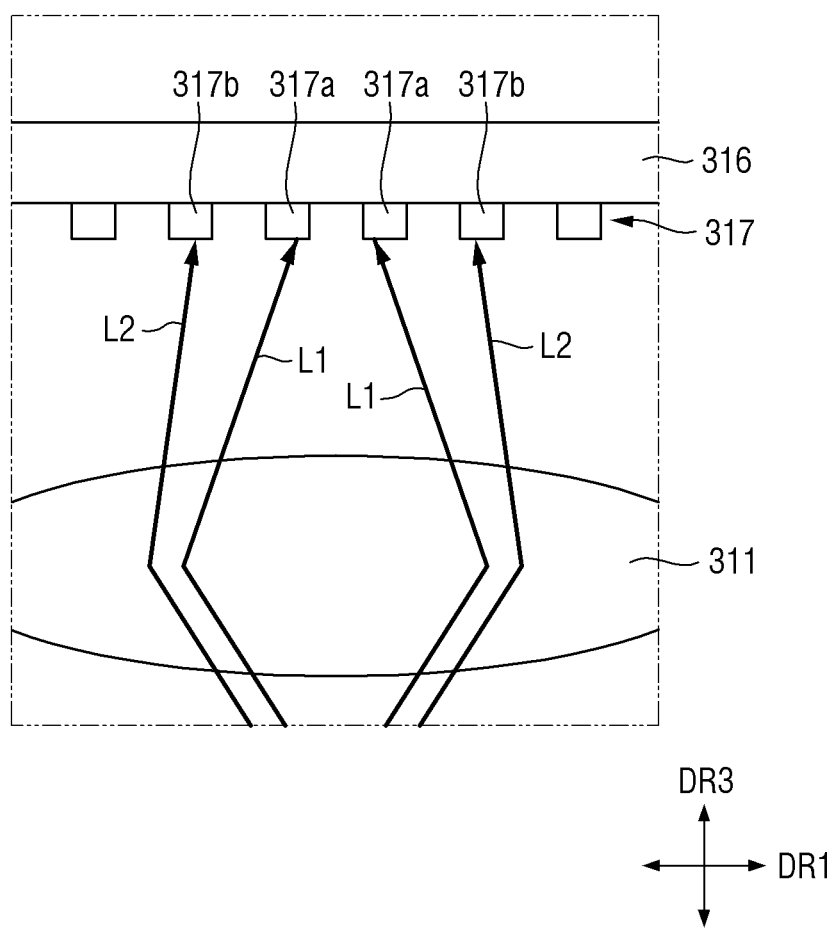
FIG. 7 is a schematic enlarged cross-sectional view of a lens unit and a sensor unit of the photographing unit of FIG. 6.

FIG. 6 is a schematic perspective view illustrating the photographing of pixels of a display panel by a photographing unit according to an embodiment. FIG. 7 is a schematic enlarged cross-sectional view of a lens unit and a sensor unit of the photographing unit of FIG. 6.

Referring to FIGS. 1, 6, and 7, the luminance values of the individual pixels PX may be obtained by the apparatus 300 for generating compensation data of a display device, including the photographing unit 310 capable of fine focusing. As shown in FIG. 6, the display panel 110 may be divided into a central portion CR and an outer portion NCR located around the central portion CR, and the photographing unit (or image capturing device) 310 may take a picture by focusing on the center point CP of the display panel 110 in the central portion CR of the display panel 110.

The photographing unit 310 may include optical sensors 317 corresponding to each pixel PX. In case that the pixels PX provided with the same input image data emit light, the optical sensors 317 may generate an image having luminance information of the pixels PX by receiving light L emitted from the corresponding pixels PX. However, the light L emitted from each pixel PX may be refracted through a lens unit 311 of the photographing unit 310 for the purpose of efficient concentration of light and may be incident on the corresponding optical sensors 317. Because of a distance between the optical sensors 317 and the lens unit 311 and a difference in the refractive index of the lens unit 311, and the like, the light L emitted from each pixel PX may be provided not only to the corresponding optical sensors 317a (corresponding to L1 of L, see, e.g., FIG. 7), but also to the optical sensors 317b corresponding to the adjacent pixels PX (corresponding to L2 of L, see, e.g., FIG. 7).

Accordingly, the luminance information of each pixel PX provided by the image generated by the photographing unit 310 having such a limit may include original luminance information of the pixel PX, interference luminance information about the influence of the adjacent pixels PX on the corresponding pixel PX, and interference luminance information about the influence of the corresponding pixel PX on the adjacent pixels PX. Accordingly, it is difficult to know accurate luminance information of the individual pixels PX, and thus, it may be difficult to produce accurate luminance correction data of the individual pixels PX. The amount of interference luminance that adjacent pixels PXs have influenced the corresponding pixel PX and the amount of interference luminance that the corresponding pixel PX has influenced the adjacent pixels PX may be greater in the outer portion NCR than the central portion CR around the center point CP, which is a focus of the photographing unit 310.

However, in the apparatus 300 for generating compensation data of a display device according to an embodiment, the luminance information of each pixel PX indicated by the image generated by the photographing unit 310 may accurately calculate or produce the interference luminance information (or a value of interference luminance by the periphery) that adjacent pixels PX have influenced the pixel PX and the interference luminance information (or a value of interference luminance to the periphery) that the pixel PX has influenced adjacent pixels PX among the original luminance information (or original luminance value) of the corresponding pixel PX, the interference luminance information (or a value of interference luminance by the periphery) that adjacent pixels PX have influenced the pixel PX, and the interference luminance information (or a value of interference luminance to the periphery) that the pixel PX has influenced adjacent pixels PX to accurately know or determine the original luminance information of individual pixels (PX), and thus accurate luminance correction data of the individual pixels PX may be generated.

The apparatus 300 for generating compensation data of a display device will be described in more detail. The apparatus 300 for generating compensation data of a display device may include a photographing unit 310 for generating images by photographing the pixels PX of the display panel 110, an image storage unit (or storage device) 320 for storing the images generated by the photographing unit (or image capturing device) 310, and a control unit (or controller) 330 for receiving the images from the image storage unit 320 and calculating luminance correction data C_DATA of individual pixels PX.

The photographing unit 310 may include a camera or a sensor. For example, the photographing unit 310 may include any available camera(s) such as a CMOS camera or a CCD camera. The photographing unit 310 according to an embodiment may include a CMOS camera, and the photographed or captured image generated by the CMOS camera may exhibit relative luminance of pixels, and thus costs may be reduced.

The image storage unit 320 may store the photographed images generated by the photographing unit 310. The image storage unit 320 may include any available storage(s) or memory device(s).

The control unit 330 may receive photographed images from the image storage unit 320 and calculate or produce accurate luminance correction data C_DATA of individual pixels PX. The control unit (or controller) 330 may include any available processor(s).

For producing accurate luminance correction data C_DATA of individual pixels PX, detailed functions and methods of the photographing unit 310, the image storage unit 320, and the control unit 330 of the apparatus 300 for generating compensation data of a display device will be described with reference to FIGS. 8 to 18.

Figure 2:
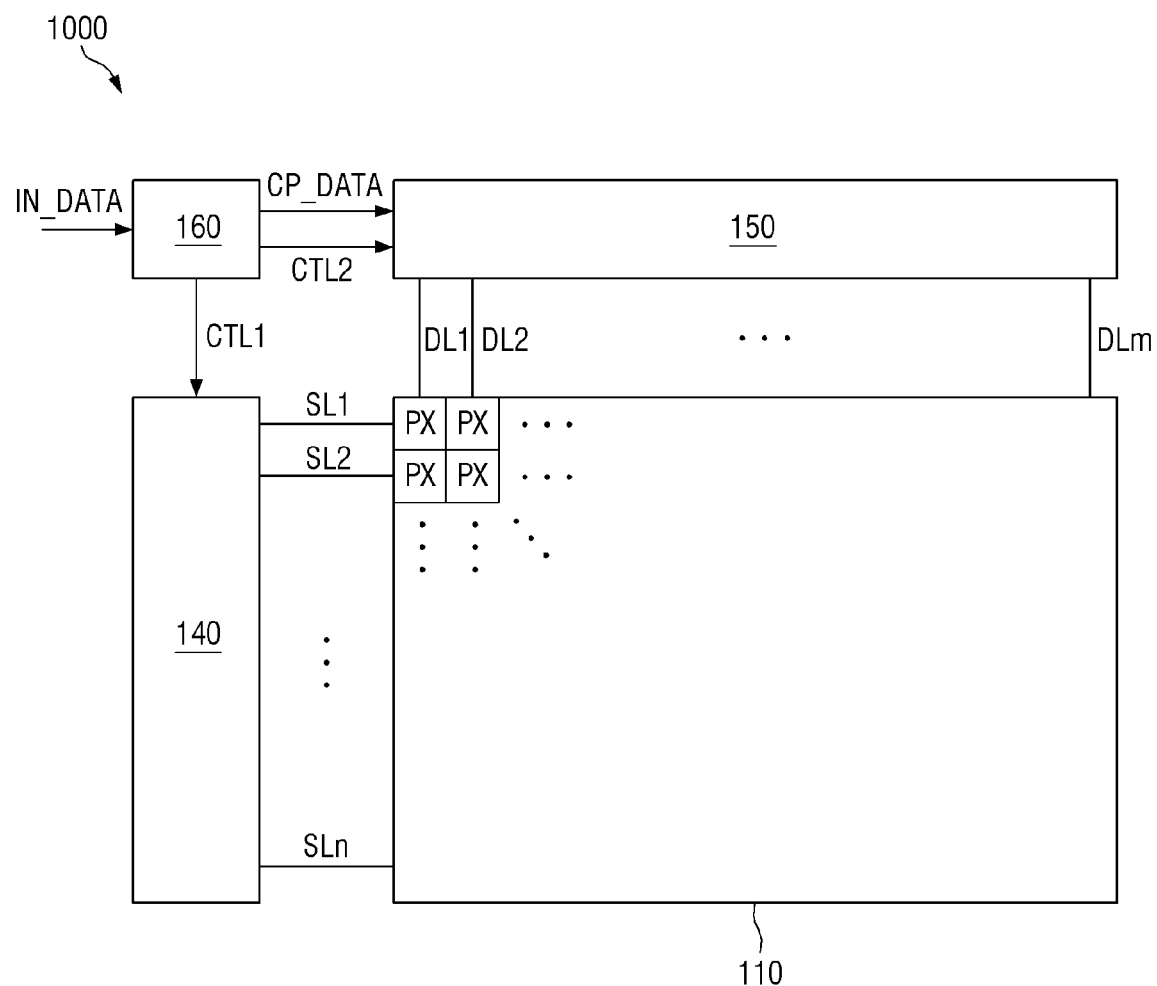
FIG. 2 is a schematic block diagram illustrating a display device according to an embodiment.
Figure 3:
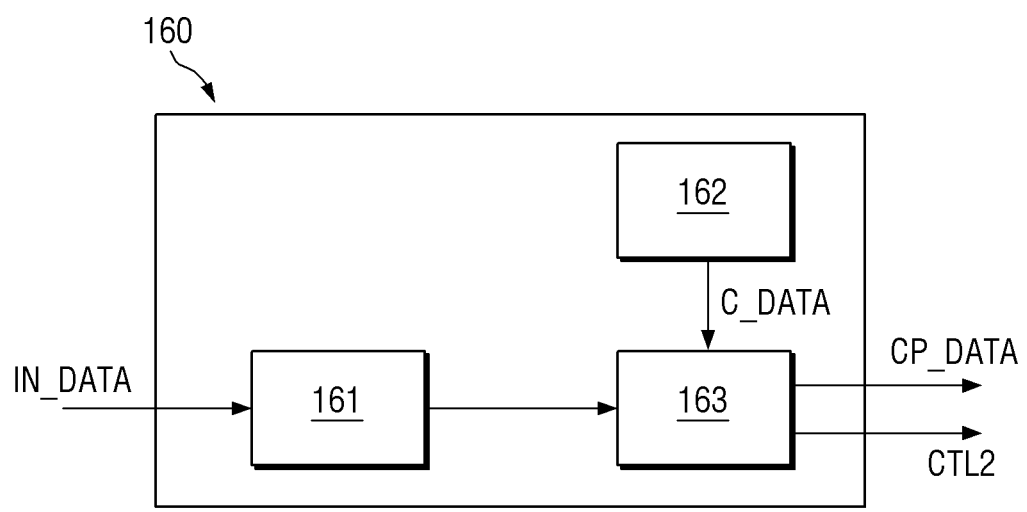
FIG. 3 is a schematic block diagram illustrating a timing controller of a display device according to an embodiment.

FIG. 2 is a schematic block diagram illustrating a display device according to an embodiment. FIG. 3 is a schematic block diagram illustrating a timing controller of a display device according to an embodiment.

Referring to FIGS. 2 and 3, a display device 1000 may include a display panel 110, a scan driver 140, a data driver 150, and a timing controller 160. The display panel 110 may include n m pixels PX located at each intersection of scan lines SL1 to SLn and data lines DL1 to DLm. The scan driver 140 may provide a scan signal to the pixels PX through the scan lines SL1 to SLn based on a first control signal CTL1.

The data driver 150 may provide a data signal to the pixels PX through the data lines DL1 to DLm based on a second control signal CTL2.

The timing controller 160 may control the scan driver 140 and the data driver 150 through the first and second control signals CTL1 and CTL2.

Moreover, the timing controller 160 may convert input image data IN DATA into corrected image data CP_DATA based on the luminance correction data C_DATA of the individual pixels PX and provide the corrected image data CP_DATA to the data driver 150.

The timing controller 160 may include a main control unit 161 receiving input image data IN DATA and generating first and second control signals CTL1 and CTL2, a memory unit 162 storing luminance correction data C_DATA of individual pixels PX and providing the luminance correction data C_DATA to a data conversion unit 163, and a data conversion unit 163 converting the input image data IN DATA into corrected image data CP_DATA based on the luminance correction data C_DATA of individual pixels PX provided from the memory unit 162 and providing the received first and second control signals CTL1 and CTL2 to the data driver 150.

As described above, the display panel according to an embodiment may be an inorganic light emitting diode display panel. A schematic diagram of an equivalent circuit of a pixel PX of the inorganic light emitting diode display panel and a cross-sectional view of a pixel PX thereof will be described.

Figure 4:
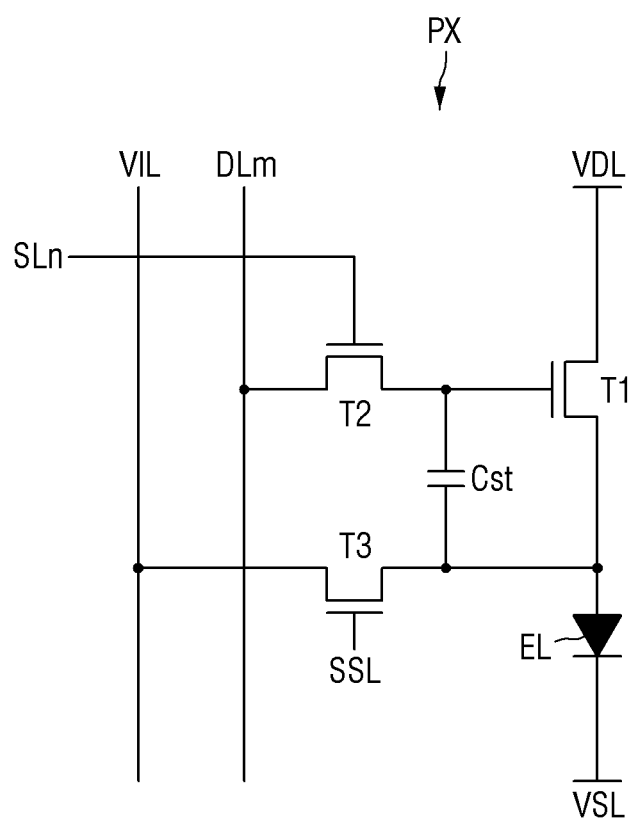
FIG. 4 is a schematic equivalent circuit diagram of a pixel according to an embodiment.

FIG. 4 is a schematic equivalent circuit diagram of a pixel according to an embodiment.

Referring to FIG. 4, each pixel PX of the display device according to an embodiment may include three transistors T1, T2, and T3 and a storage capacitor Cst in addition to a light emitting diode EL.

The light emitting diode EL may emit light by a current supplied through the first transistor T1. The light emitting diode EL may include a first electrode, a second electrode, and at least one light emitting element disposed between the first electrode and the second electrode. The light emitting element may emit light of a specific wavelength band by an electric signal transmitted from the first electrode and the second electrode.

An end of the light emitting diode EL may be electrically connected to a source electrode of the first transistor T1, and another end thereof may be electrically connected to a second voltage line VSL to which a low-potential voltage (hereinafter referred to as a second power voltage) lower than a high-potential voltage (hereinafter referred to as a first power voltage) of a first voltage line VDL is supplied. Further, another end of the light emitting diode EL may be electrically connected to a source electrode of the second transistor T2.

The first transistor T1 may adjust a current flowing from the first voltage line VDL, to which the first power voltage is supplied, to the light emitting diode EL according to the voltage difference between the gate electrode and the source electrode. As an example, the first transistor T1 may be a driving transistor for driving the light emitting diode EL. The gate electrode of the first transistor T1 may be electrically connected to the source electrode of the second transistor T2, the source electrode thereof may be electrically connected to the first electrode of the light emitting diode EL, and the drain electrode thereof may be electrically connected to the first voltage line VDL to which the first power voltage is applied.

The second transistor T2 may be turned on by a scan signal of the scan line SLn to electrically connect the data line DLm to the gate electrode of the first transistor T1. The gate electrode of the second transistor T2 may be electrically connected to the scan line SLn, the source electrode thereof may be electrically connected to the gate electrode of the first transistor T1, and the drain electrode thereof may be electrically connected to the data line DLm.

The third transistor T3 may be turned on by a sensing signal of a sensing line SSL to electrically connect an initialization voltage line VIL to an end of the light emitting diode EL. The gate electrode of the third transistor T3 may be electrically connected to the sensing line SSL, the drain electrode thereof may be electrically connected to the initialization voltage line VIL, and the source electrode thereof may be electrically connected to an end of the light emitting diode EL or the source electrode of the first transistor T1.

In an embodiment, the source electrode and drain electrode of each of the transistors T1, T2, and T3 are not limited to the above description, and vice versa. Each of the transistors T1, T2, and T3 may be formed as a thin film transistor. Although FIG. 3 illustrates that each of the transistors T1, T2, and T3 is formed as an N-type metal oxide semiconductor field effect transistor (MOSFET), the disclosure is not limited thereto. For example, the transistors T1, T2, and T3 may be formed as P-type MOSFETs, or some of them may be formed as N-type MOSFETs, and others of them may be formed as P-type MOSFETs.

The storage capacitor Cst may be formed between the gate electrode and the source electrode of the first transistor T1. The storage capacitor Cst may store a voltage difference between the gate voltage and the source voltage of the first transistor T1.

Figure 5:
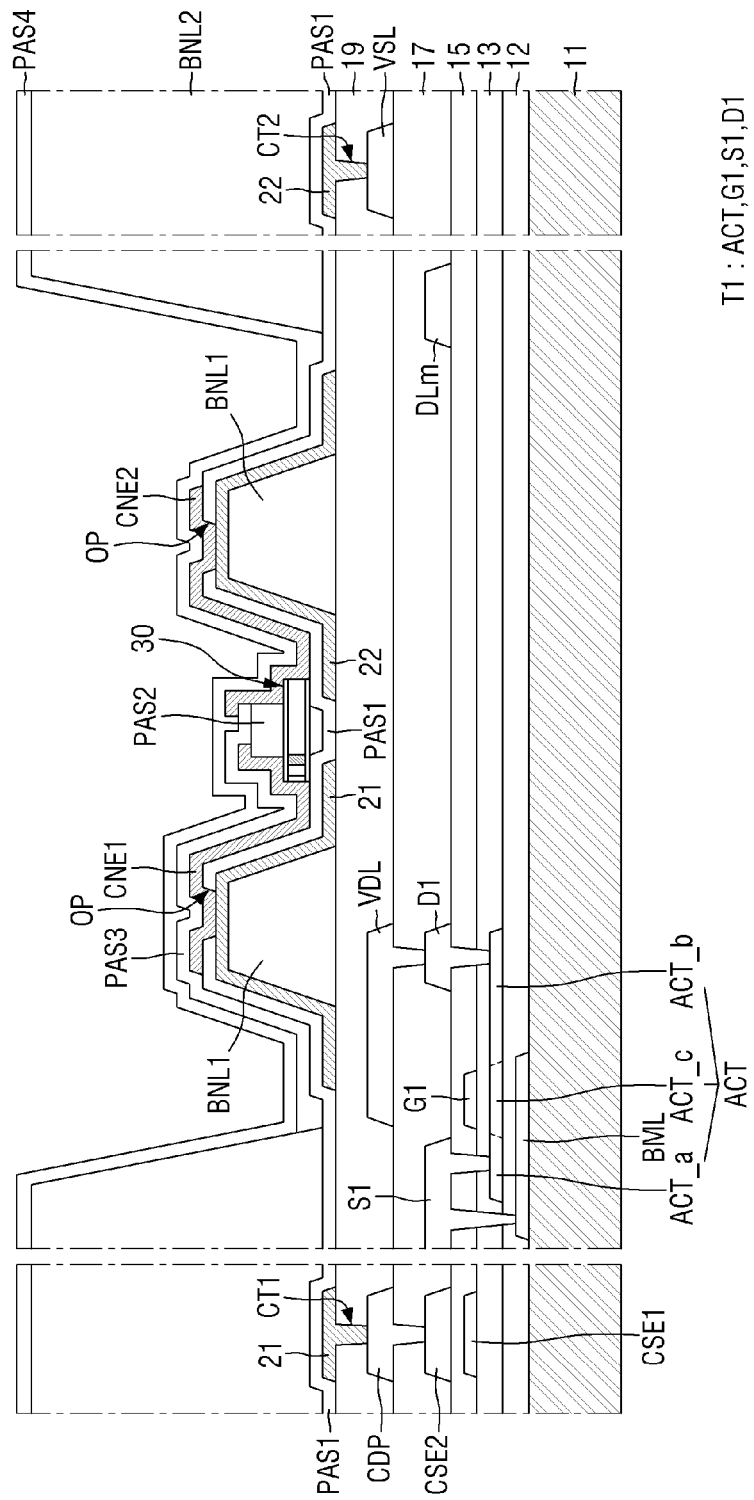
FIG. 5 is a schematic cross-sectional view of one pixel of FIG. 4.

Referring to FIGS. 4 and 5, the display panel may include a first substrate 11, and a semiconductor layer, conductive layers, and insulating layers, which are disposed on the first substrate 11. Each of the semiconductor layer, the conductive layers, and the insulating layers may form a circuit layer and a light emitting element layer of a display panel.

The first substrate 11 may be an insulating substrate. The first substrate 11 may be made of an insulating material such as glass, quartz, or polymer resin. The first substrate 11 may be a rigid substrate but may be a flexible substrate capable of bending, folding, rolling, or the like.

A light blocking layer BML may be disposed on the first substrate 11. The light blocking layer BML may overlap an active layer ACT of the first transistor T1 of the display device 10. The light blocking layer BML may include a material that blocks light and may prevent light from being incident on the active layer ACT of the first transistor T1. In some cases, the light blocking layer BML may be omitted.

A buffer layer 12 may be disposed on the first substrate 11 in addition to the light blocking layer BML. The buffer layer 12 may entirely overlap the first substrate 11. The buffer layer 12 may be formed on the first substrate 11 to protect the first transistors T1 of the pixel PX from moisture penetrating through the first substrate 11 vulnerable to moisture permeation and may perform a surface planarization function.

A semiconductor layer may be disposed on the buffer layer 12. The semiconductor layer may include the active layer ACT of the first transistor T1. The semiconductor layer may include polycrystalline silicon, monocrystalline silicon, or oxide semiconductor.

A first gate insulating layer 13 may be disposed on the semiconductor layer and the buffer layer 12. The first gate insulating layer 13 may be disposed on the buffer layer 12 in addition to the semiconductor layer. The first gate insulating layer 13 may function as a gate insulating layer of each transistor.

A first gate conductive layer may be disposed on the first gate insulating layer 13. The first gate conductive layer may include a gate electrode G1 of the first transistor T1 and a first capacitance electrode CSE1 of the storage capacitor Cst. The gate electrode G1 may overlap a channel region ACT c of the active layer ACT in a thickness direction. The first gate conductive layer may be formed as a single layer or multiple layers including any one of molybdenum (Mo), aluminum (Al), chromium (Cr), gold (Au), titanium (Ti), nickel (Ni), neodymium (Nd), and copper (Cu), or an alloy thereof. However, the disclosure is not limited thereto.

A first interlayer insulating layer 15 may be disposed on the first gate conductive layer. The first interlayer insulating layer 15 may function as an insulating layer between the first gate conductive layer and other layers disposed thereon.

A first data conductive layer may be disposed on the first interlayer insulating layer 15. The first data conductive layer may include a first source electrode S1 and a first drain electrode D1 of the first transistor T1, a data line DLm, and a second capacitance electrode CSE2.

The first source electrode S1 and first drain electrode D1 of the first transistor T1 may contact doped regions ACT_a and ACT_b of the active layer ACT, respectively, through a contact hole penetrating the first interlayer insulating layer 15 and the first gate insulating layer 13. The first source electrode S1 of the first transistor T1 may be electrically connected to the light blocking layer BML through another contact hole.

The data line DLm may apply a data signal to another transistor (not shown) included in the display device 10. Although not shown in the drawing, the data line DLm may be electrically connected to a source/drain electrode of another transistor to transmit a signal applied from the data line DLm.

The second capacitance electrode CSE2 may overlap the first capacitance electrode CSE1 in the thickness direction. In an embodiment, the second capacitance electrode CSE2 may be electrically connected to the first source electrode S1 and/or be integral with the first source electrode S1.

The first data conductive layer may be formed as a single layer or multiple layers including one of molybdenum (Mo), aluminum (Al), chromium (Cr), gold (Au), titanium (Ti), nickel (Ni), neodymium (Nd), and copper (Cu), or an alloy thereof. However, the disclosure is not limited thereto.

A second interlayer insulating layer 17 may be disposed on the first data conductive layer. The second interlayer insulating layer 17 may function as an insulating layer between the first data conductive layer and other layers disposed thereon.

A second data conductive layer may be disposed on the second interlayer insulating layer 17. The second data conductive layer may include a first voltage line VDL, a second voltage line VSL, and a first conductive pattern CDP. A high-potential voltage (or a first power voltage) supplied to the first transistor T1 may be applied to the first voltage line VDL, and a low-potential voltage (or a second power voltage) supplied to the second electrode 22 may be applied to the second voltage line VSL. Further, an alignment signal required to align light emitting elements 30 during the process of manufacturing the display device 10 may be applied to the second voltage line VSL.

The first conductive pattern CDP may be electrically connected to the second capacitance electrode CSE2 through a contact hole formed in the second interlayer insulating layer 17. The second capacitance electrode CSE2 may be integral with the first source electrode S1 of the first transistor T1, and the first conductive pattern CDP may be electrically connected to the first source electrode S1. The first conductive pattern CDP may also electrically contact a first electrode 21 to be described below, and the first transistor T1 may transmit a first power voltage applied from the first voltage line VDL to the first electrode 21 through the first conductive pattern CDP.

The second data conductive layer may be formed as a single layer or multiple layers including one of molybdenum (Mo), aluminum (Al), chromium (Cr), gold (Au), titanium (Ti), nickel (Ni), neodymium (Nd), and copper (Cu), or an alloy thereof. However, the disclosure is not limited thereto.

A first planarization layer 19 may be disposed on the second data conductive layer. The first planarization layer 19 may include an organic insulating material, for example, an organic material such as polyimide (PI) and may perform a surface planarization function.

First banks BNL1, electrodes 21 and 22, a light emitting element 30, contact electrodes CNE1 and CNE2, and a second bank BNL2 may be arranged on the first planarization layer 19. Further, insulating layers PAS1, PAS2, PAS3, and PAS4 may be arranged on the first planarization layer 19.

The first banks BNL1 may be directly disposed on the first planarization layer 19. The first bank BNL1 may have a structure in which at least a part of the first bank BNL1 protrudes from the upper surface of the first planarization layer 19. The protrusion portion of the first bank BNL1 may have an inclined side surface, and the light emitted from the light emitting element (or light emitting diode) 30 may be reflected by the electrodes 21 and 22 disposed on the first bank BNL1 to be emitted upward from the first planarization layer 19. The first bank BNL1 may provide an area where the light emitting element 30 is disposed and may function as a reflective partition wall reflecting the light emitted from the light emitting element 30 upward.

The electrodes 21 and 22 may be disposed on the first bank BNL1 and the first planarization layer 19. The electrodes 21 and 22 may include a first electrode 21 and a second electrode 22.

The first electrode 21 may be electrically connected to the first transistor T1 through a first contact hole CT1, and the second electrode 22 may be electrically connected to the second voltage line VSL through a second contact hole CT2.

The first electrode 21 and the second electrode 22 may be directly disposed on the first banks BNL1. Each of the first electrode 21 and the second electrode 22 may be formed to have a greater width than the first bank BNL1.

Each of the electrodes 21 and 22 may include a conductive material having high reflectance. For example, each of the electrodes 21 and 22 may include a metal such as silver (Ag), copper (Cu), or aluminum (Al) or may include an alloy containing aluminum (Al), nickel (Ni), or lanthanum (La), as a high-reflectance material. Each of the electrodes 21 and 22 may reflect the light emitted from the light emitting element 30 and traveling toward the side surface of the first bank BNL1 in an upward direction of each pixel PX.

The electrodes 21 and 22 may be electrically connected to the light emitting devices 30, and a predetermined voltage may be applied to the electrodes 21 and 22 such that the light emitting element 30 emits light. The electrodes 21 and 22 may be electrically connected to the light emitting element 30 through contact electrodes CNE1 and CNE2 and may transmit electric signals applied to the electrodes 21 and 22 to the light emitting element 30 through the contact electrodes CNE1 and CNE2.

One of the first electrode 21 and the second electrode 22 may be electrically connected to an anode electrode of the light emitting element 30, and the other thereof may be electrically connected to a cathode electrode of the light emitting element 30. However, the disclosure is not limited thereto, and vice versa.

A first insulating layer PAS1 may be disposed on the first planarization layer 19. The first insulating layer PAS1 may cover or overlap the first banks BNL1, the first electrode 21, and the second electrode 22.

In an embodiment, the first insulating layer PAS1 may include an opening OP partially exposing the first electrode 21 and the second electrode 22. Each opening OP may partially expose a portion of each of the electrodes 21 and 22 disposed on the upper surface of the first bank BNL1. Some of the contact electrodes CNE1 and CNE2 may electrically contact the electrodes 21 and 22 exposed through the opening OP, respectively.

The first insulating layer PAS1 may have a step (or height differences) formed between the first electrode 21 and the second electrode 22 such that a part of the upper surface thereof is depressed. The second bank BNL2 may be disposed on the first insulating layer PAS1. The second bank BNL2 may have a height greater than that of the first bank BNL1.

The light emitting element 30 may be disposed on the first insulating layer PAS1. The light emitting elements 30 arranged in each pixel PX may include light emitting layers including different materials to emit light of different wavelength bands to the outside.

Both ends of the light emitting element 30 may be disposed on the electrodes 21 and 22 between the first banks BNL1. The extension length of the light emitting element 30 may be greater than the distance between the first electrode 21 and the second electrode 22, and both ends of the light emitting element 30 may be disposed on the first electrode 21 and the second electrode 22, respectively. For example, an end of the light emitting element 30 may be disposed on the first electrode 21, and another end thereof may be disposed on the second electrode 22.

A second insulating layer PAS2 may be partially disposed on the light emitting element 30. For example, the second insulating layer PAS2 may have a width smaller than the length of the light emitting element 30 such that the second insulating layer PAS2 surrounds the light emitting element 30 and both ends of the light emitting element 30 are exposed, and the second insulating layer PAS2 may be disposed on the light emitting element 30.

Contact electrodes CNE1 and CNE2 and a third insulating layer PAS3 may be disposed on the second insulating layer PAS2.

Each of the contact electrodes CNE1 and CNE2 may electrically contact the light emitting element 30. The first contact electrode CNE1 may electrically contact an end of the light emitting element 30, and the second contact electrode CNE2 may electrically contact another end of the light emitting element 30.

The contact electrodes CNE1 and CNE2 may include a transparent conductive material. For example, the contact electrodes CNE1 and CNE2 may include ITO, IZO, ITZO, or aluminum (Al). The light emitted by the light emitting element 30 may pass through the contact electrodes CNE1 and CNE2 and travel toward the electrodes 21 and 22. However, the disclosure is not limited thereto.

The third insulating layer PAS3 may cover or overlap the first contact electrode CNE1. The third insulating layer PAS3 may include the first contact electrode CNE1 and may overlap a side on which the first contact electrode CNE1 is disposed based on the second insulating layer PAS2.

A fourth insulating layer PAS4 may be disposed in the display area DPA of the first substrate 11. The fourth insulating layer PAS4 may entirely overlap the display area DPA of the first substrate 11. The fourth insulating layer PAS4 may function to protect members arranged on the first substrate 11 from external environments. However, the fourth insulating layer PAS4 may be omitted.

Each of the above-described first insulating layer PAS1, second insulating layer PAS2, third insulating layer PAS3, and fourth insulating layer PAS4 may include an inorganic insulating material or an organic insulating material.

Hereinafter, a method of generating compensation data of a display device according to an embodiment will be described.

FIGS. 8 to 16 are schematic plan views illustrating steps of calculating or producing luminance correction data of a target pixel in a method of generating compensation data of a display device according to an embodiment.

Referring to FIGS. 1 to 3 and 8 to 16, images generated by the photographing units 310 are illustrated in FIGS. 8 to 16. FIGS. 8 to 16 illustrate pixels PX in a matrix arrangement. The pixels PX may be arranged according to a row Rp and a column Cq. Each pixel PX may be named pixel PXpq according to a position according to the row Rp and the column Cq, where p and q are natural numbers.

Figure 9:
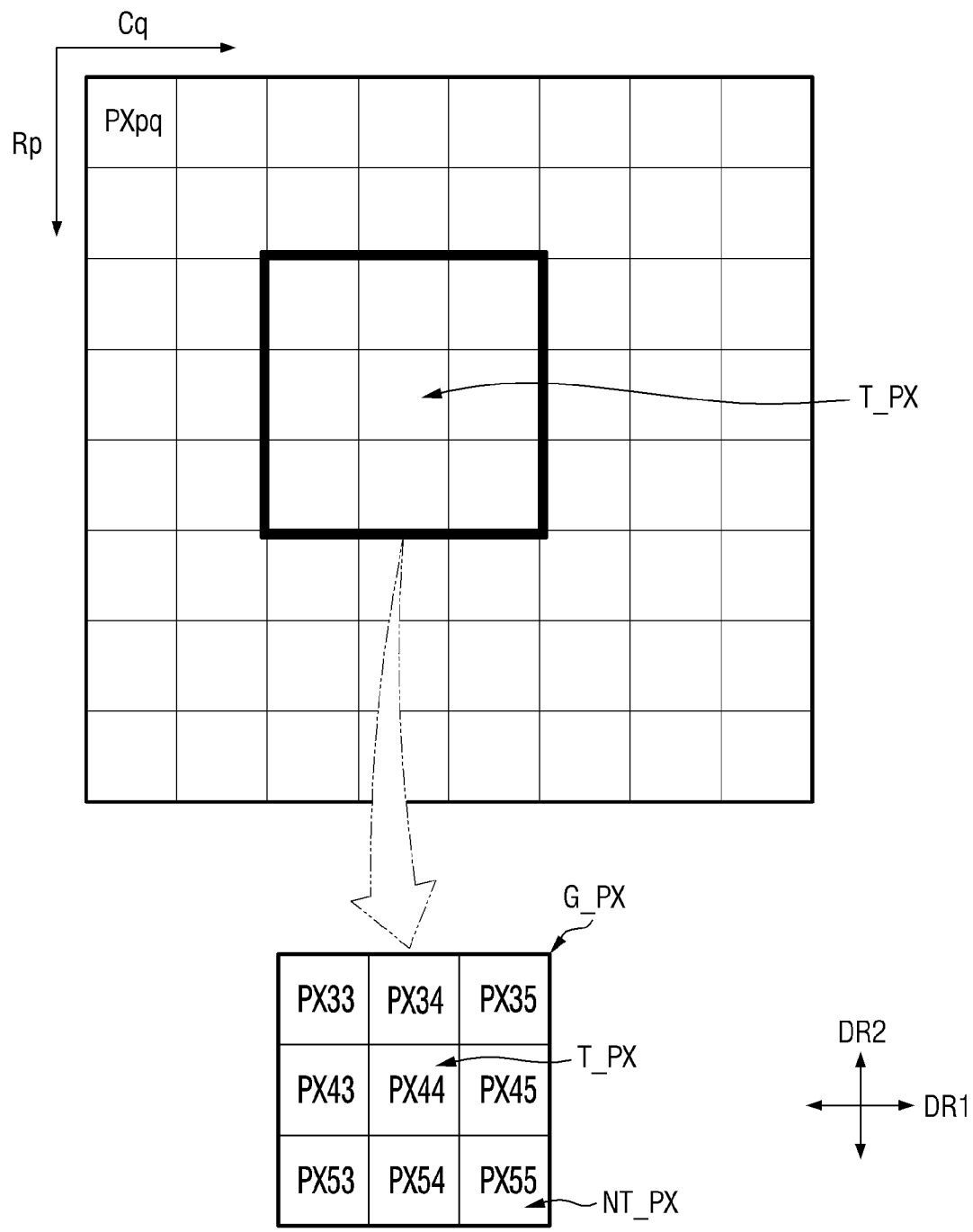

Flashing (switching on/off) of the pixels PX may be determined based on the second control signal CTL2 of the timing controller 160. As illustrated in FIG. 9, the timing controller 160 may set a first pixel group G_PX including a first target pixel T_PX and first non-target pixels NT_PX around the first target pixel T_PX. Accurate luminance correction data C_DATA of the first target pixel T_PX may be produced. The first non-target pixel NT_PX will be defined as pixels PX disposed at positions that cause luminance interference with the first target pixel T_PX. The first non-target pixel NT_PX may be, for example, pixels PX contacting the first target pixel T_PX. For example, the first non-target pixel NT_PX may be pixels PX closest to one upper side of the first target pixel T_PX in the second direction DR2, one lateral side thereof in the first direction DR1, the other lateral side thereof in the first direction DR1, the other lower side thereof in the second direction DR2, a corner where one upper side thereof in the second direction DR2 meets one lateral side thereof in the first direction DR1, a corner where one upper side thereof in the second direction DR2 meets the other lateral side thereof in the first direction DR1, a corner where the other lower side thereof in the second direction DR2 meets one lateral side thereof in the first direction DR1, and a corner where the other lower side thereof in the second direction DR2 meets the other lateral side thereof in the first direction DR1.

Figure 8:
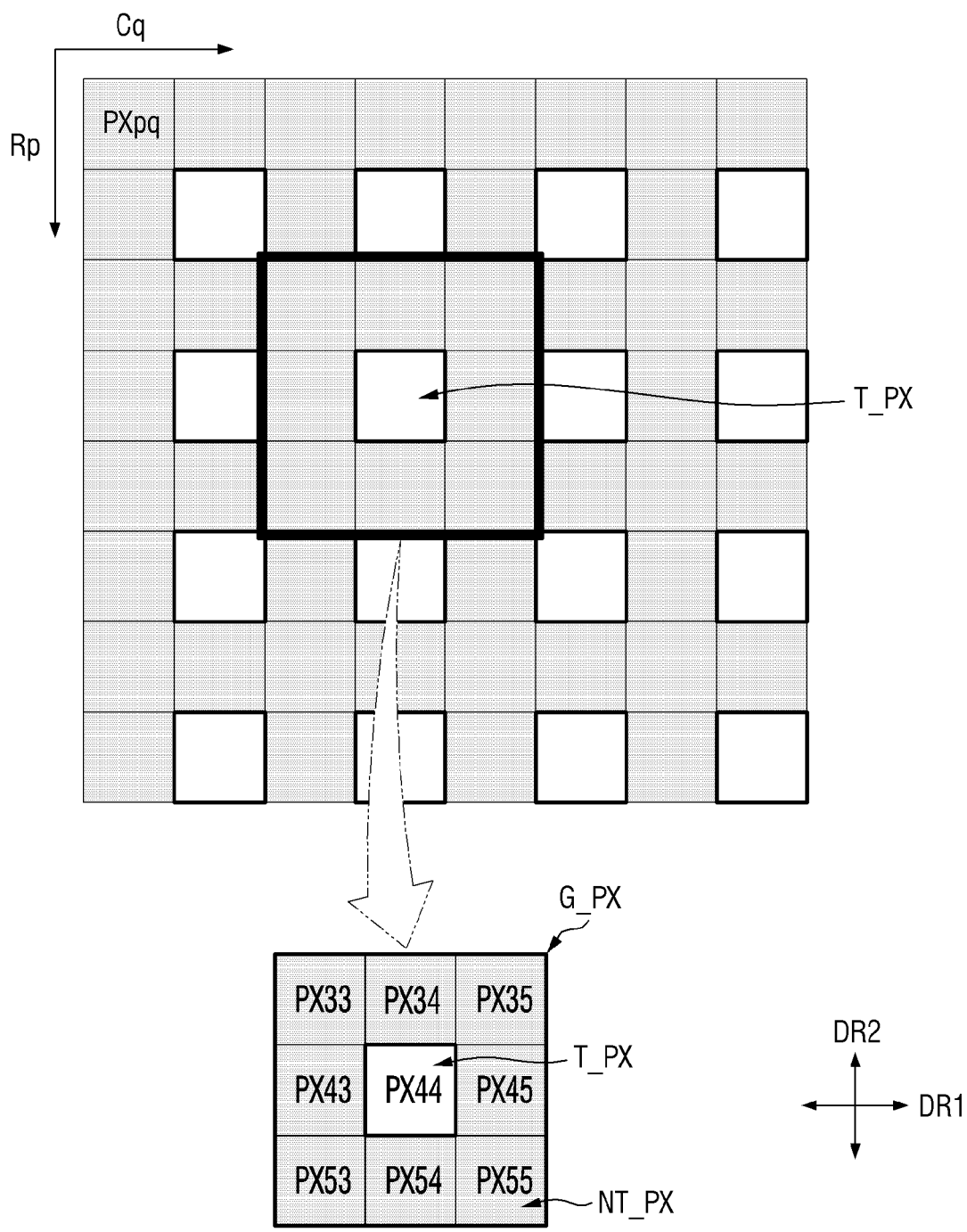
FIGS. 8 to 16 are schematic plan views illustrating steps of producing luminance correction data of a target pixel in a method of generating compensation data of a display device according to an embodiment.

The pixels PX partitioned by a thick line of FIG. 8 may be the first target pixels T_PX. In an embodiment, the first non-target pixel NT_PX is defined as pixels PX closest to one upper side of the first target pixel T_PX in the second direction DR2, one lateral side thereof in the first direction DR1, the other lateral side thereof in the first direction DR1, the other lower side thereof in the second direction DR2, a corner where one upper side thereof in the second direction DR2 meets one lateral side thereof in the first direction DR1, a corner where one upper side thereof in the second direction DR2 meets the other lateral side thereof in the first direction DR1, a corner where the other lower side thereof in the second direction DR2 meets one lateral side thereof in the first direction DR1, and a corner where the other lower side thereof in the second direction DR2 meets the other lateral side thereof in the first direction DR1. As illustrated in FIG. 8, the first target pixels T_PX may be spaced apart from each other with a pixel PX (or first non-target pixel NT_PX) therebetween in the row Rp and the column Cq. A first target pixel T_PX and first non-target pixels NT_PX around the first target pixel T_PX may form a first pixel group G_PX.

In the enlarged view of FIG. 8, a pixel PX44 located in the fourth row R4 and the fourth column C4 is illustrated as the first target pixel T_PX, and pixels PX33, PX34, PX35, PX43, PX45, PX53, PX54, and PX55 around the pixel PX44 are illustrated as the first non-target pixels NT_PX. In the following embodiments, for convenience of explanation, the pixel PX44 located in the fourth row R4 and the fourth column C4 is illustrated as the first target pixel T_PX, and the pixels PX33, PX34, PX35, PX43, PX45, PX53, PX54, and PX55 around the pixel PX44 are illustrated as the first non-target pixels NT_PX, but if there is no need to distinguish, the same description may be applied to the first target pixels T_PX other than the pixel PX44 and the first non-target pixels NT_PX thereabout.

After the timing controller 160 sets the first pixel group G_PX including the first target pixel T_PX and the first non-target pixels NT_PX around the first target pixel T_PX, the timing controller 160 may switch on the first target pixel T_PX and switches off the first non-target pixels NT_PX, as shown in FIG. 8. The photographing unit 310 may capture or photograph the switched-on first target pixel T_PX and the switched-off first non-target pixels NT_PX to generate a first captured image. The generated first captured image may be stored in the image storage unit 320.

Subsequently, the timing controller 160 may switch on both the first target pixel T_PX and the first non-target pixels NT_PX as shown in FIG. 9. The photographing unit 310 may capture or photograph the switched-on first target pixel T_PX and first non-target pixels NT_PX to generate a second captured image. The generated second captured image may be stored in the image storage unit 320.

Figure 10:
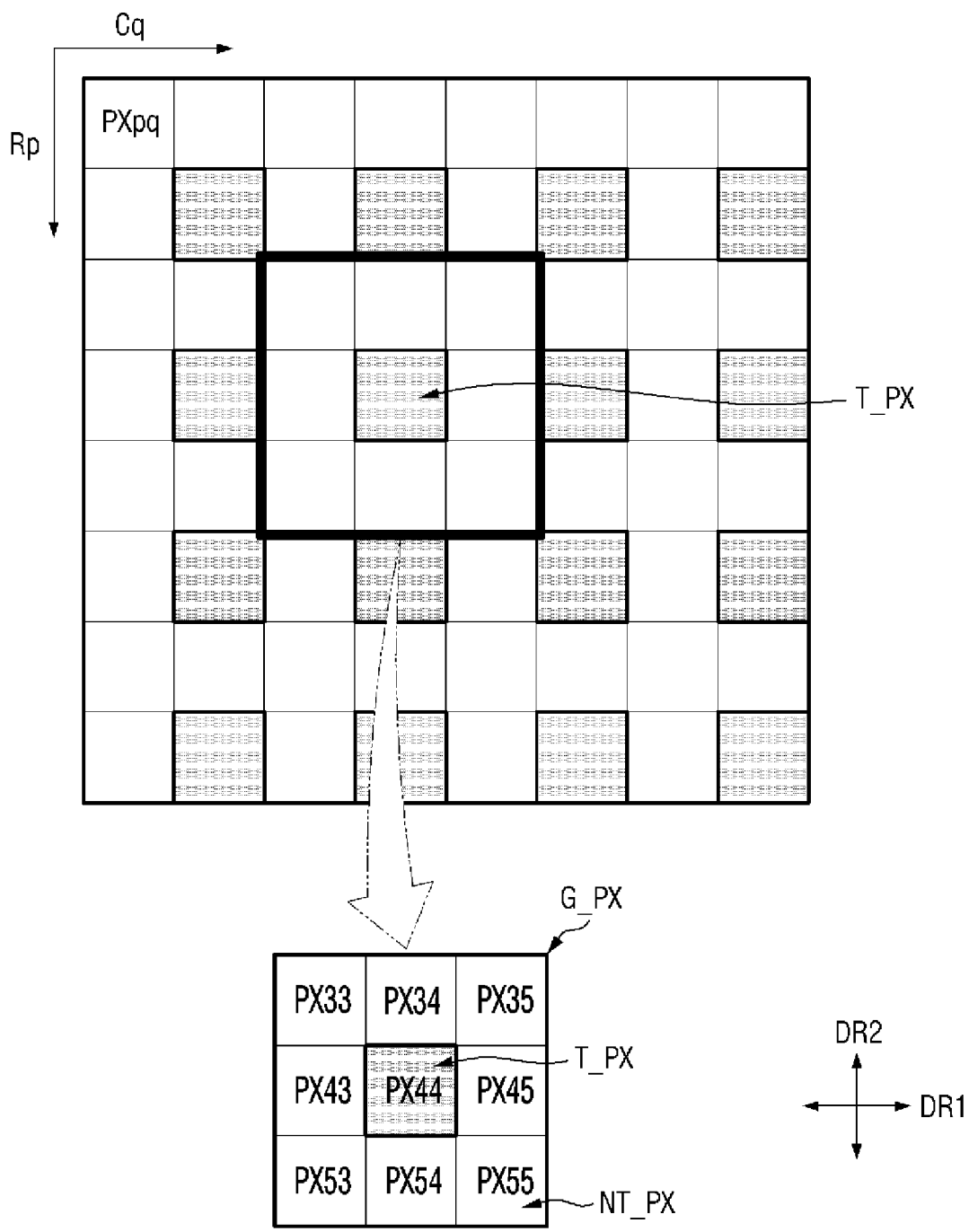

Subsequently, the timing controller 160 may switch off the first target pixel T_PX and switch on the first non-target pixels NT_PX as shown in FIG. 10. The photographing unit 310 may capture or photograph the switched-off first target pixel T_PX and the switched-on first non-target pixels NT_PX to generate a third captured image. The generated third captured image may be stored in the image storage unit 320.

Figure 11:
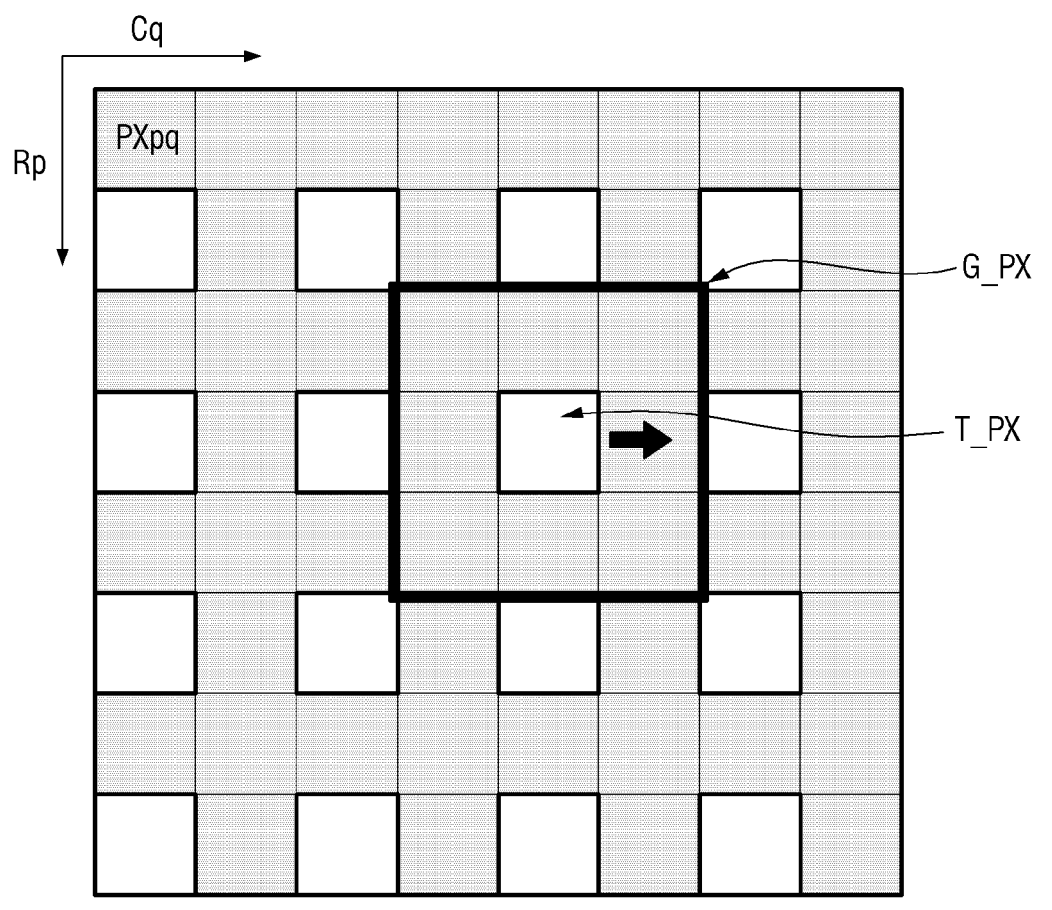

Subsequently, as shown in FIG. 11, the timing controller 160 may set the pixels (for example, pixel PX45) located on a side (e.g., a right side of the drawing) of the first target pixels T_PX in the first direction DR1 as second target pixels T_PX, and may set the pixels around the second target pixels T_PX are set as second non-target pixels NT_PX. The second target pixel T_PX and the second non-target pixels NT_PX may form a second pixel group G_PX, and the second pixel group G_PX may be understood as being moved from the first pixel group G_PX to a side (e.g., a right side of the drawing) in the first direction DR1.

Figure 12:
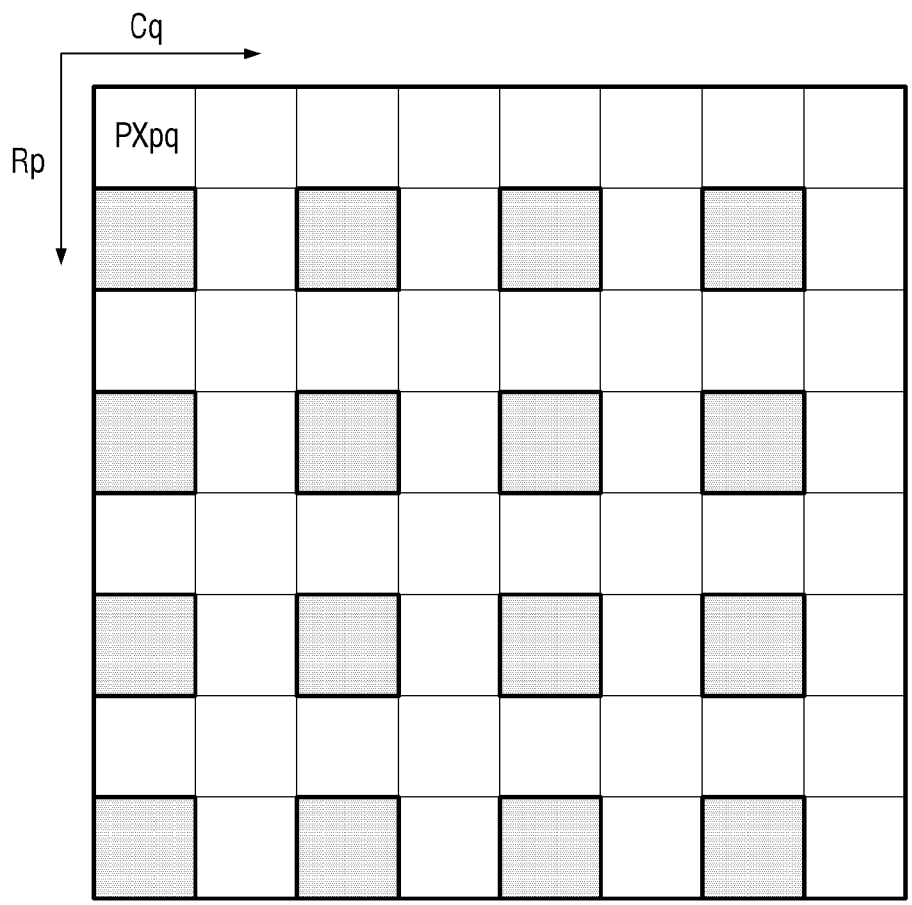
Figure 12:
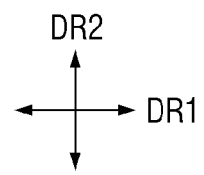

As shown in FIGS. 11 and 12, by series of processes described with reference to FIGS. 8 to 10, the timing controller 160 may switch on or off the second target pixel T_PX and the second non-target pixels NT_PX, the photographing unit 310 may photograph the corresponding pixels T_PX and NT_PX, and the corresponding captured images (the fourth to sixth captured images) may be stored in the image storage unit 320.

Figure 13:
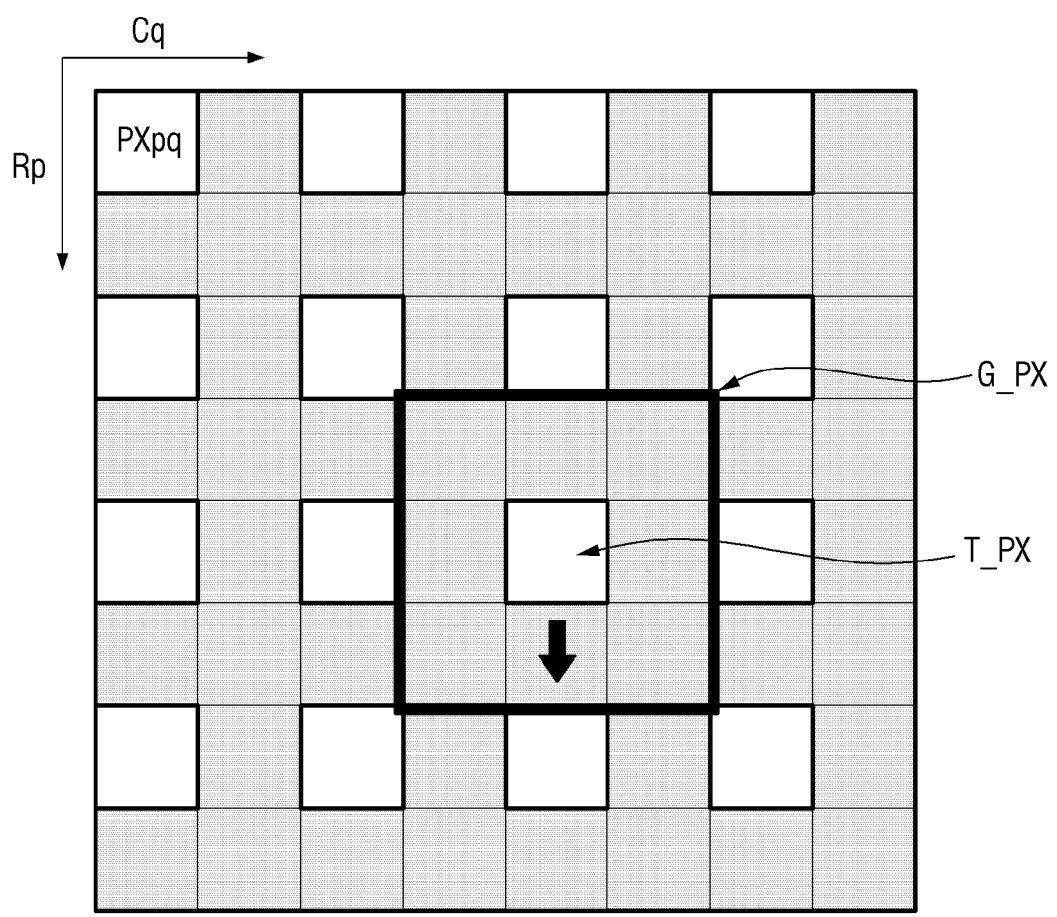

Subsequently, as shown in FIG. 13, the timing controller 160 may set the pixels (for example, pixel PX55) located on another side (a lower side of the drawing) of the second target pixels T_PX in the second direction DR1 as third target pixels T_PX, and may set the pixels around the third target pixels T_PX as third non-target pixels NT_PX. The third target pixel T_PX and the third non-target pixels NT_PX may form a third pixel group G_PX, and the third pixel group G_PX may be understood as being moved from the second pixel group G_PX to another side (a lower side of the drawing) in the second direction DR2.

Figure 14:
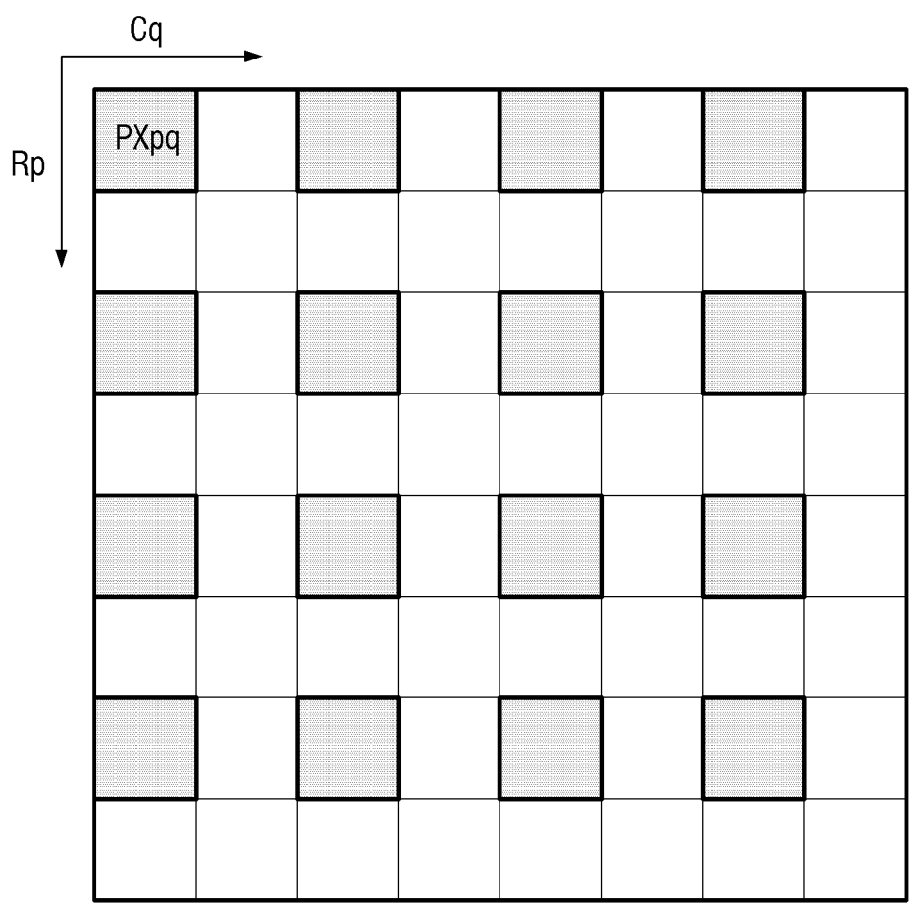
Figure 14:
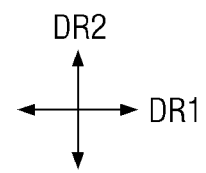

As shown in FIGS. 13 and 14, by series of processes described with reference to FIGS. 8 to 10, the timing controller 160 may switch on or off the third target pixel T_PX and the third non-target pixels NT_PX, the photo-graphing unit 310 may photograph the corresponding pixels T_PX and NT_PX, and the corresponding captured images (the seventh to ninth captured images) may be stored in the image storage unit 320.

Figure 15:
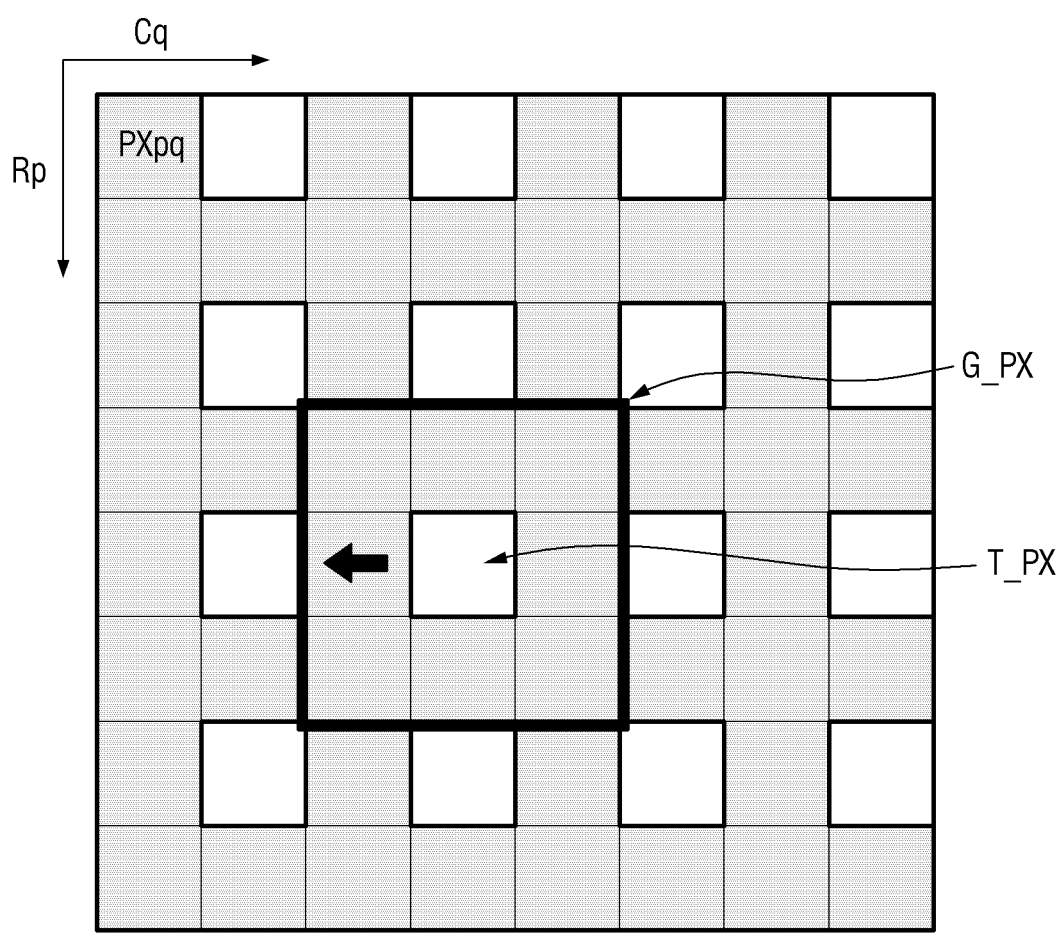

Subsequently, as shown in FIG. 15, the timing controller 160 may set the pixels (for example, pixel PX54) located on another side (a left side of the drawing) of the third target pixels T_PX in the second direction DR1 as fourth target pixels T_PX, and may set the pixels around the fourth target pixels T_PX as fourth non-target pixels NT_PX. The fourth target pixel T_PX and the fourth non-target pixels NT_PX may form a fourth pixel group G_PX, and the fourth pixel group G_PX may be understood as being moved from the third pixel group G_PX to another side (a left side of the drawing) in the first direction DR1.

Figure 16:
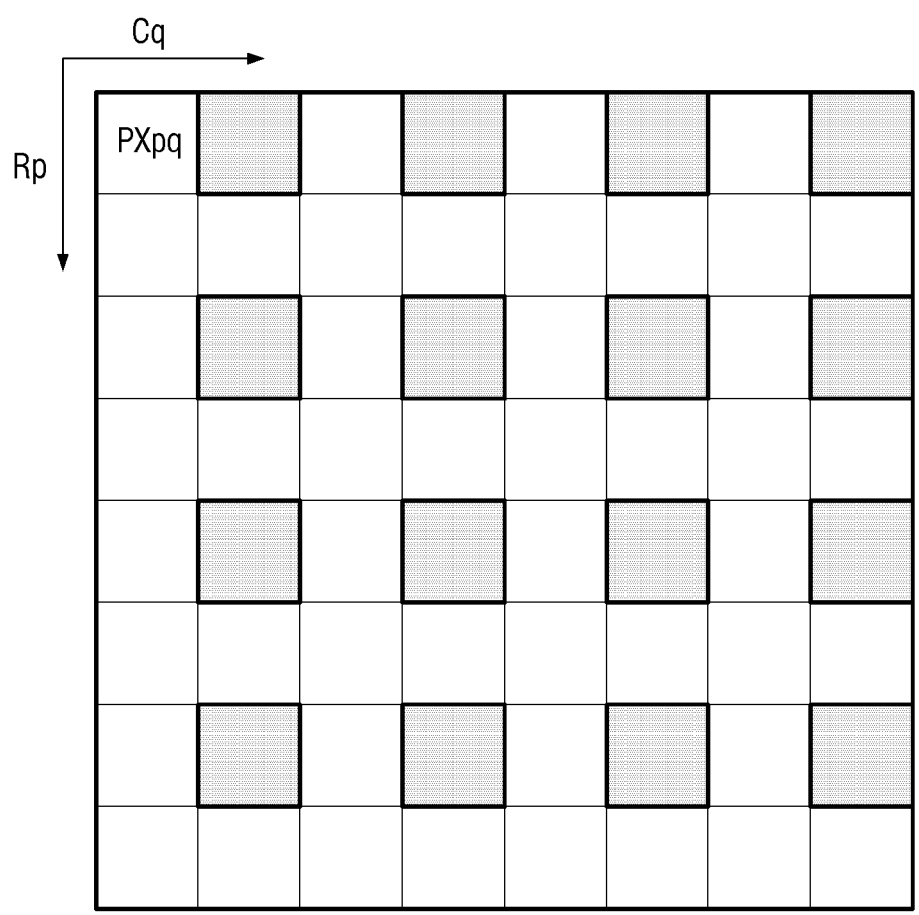
Figure 16:
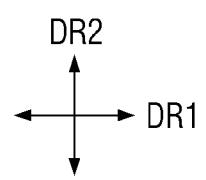

As shown in FIGS. 15 and 16, by series of processes described with reference to FIGS. 8 to 10, the timing controller 160 may switch on or off the fourth target pixel T_PX and the fourth non-target pixels NT_PX, the photo-graphing unit 310 may photograph the corresponding pixels T_PX and NT_PX, and the corresponding captured images (the tenth to twelfth photographed images) may be stored in the image storage unit 320.

Through the first to twelfth captured images generated by the series of processes described with reference to FIGS. 8 to 16, the control unit 330 may generate luminance information of individual pixels PX of the display panel 110, original luminance information, interference luminance information that the adjacent pixels PX have influenced the corresponding pixel PX, interference luminance information that the corresponding pixel PX have influenced the adjacent pixels PX, and luminance correction data of the corresponding pixel PX.

The process by which the control unit 330 generates the luminance information of individual pixels PX of the display panel 110, the original luminance information, the interference luminance information that the adjacent pixels PX have influenced the corresponding pixel PX, the interference luminance information that the corresponding pixel PX have influenced the adjacent pixels PX, and the luminance correction data of the corresponding pixel PX through the first to third captured images will be described. If there is no need to distinguish in particular the process of generating the corresponding information and data through the fourth to twelfth captured images, a detailed description thereof will be omitted. Moreover, hereinafter, the process by which the control unit 330 generates the corresponding information and data through the first to third captured images will be described. For convenience of explanation, a case where a pixel PX44 is set as the first target pixel T_PX, pixels PX33, PX34, PX35, PX43, PX45, PX53, PX54, and PX55 around the pixel PX44 are set as the first non-target pixels NT_PX will be described as an example.

The control unit 330 may calculate Equations 1 to 3 below through the first to third captured images. In Equations 1 to 3, for convenience of explanation, the pixels PX33, PX34, PX35, PX43, PX45, PX53, PX54, and PX55 around the pixel PX44 are referred to as "NPX44."

$$L(PX44\_IM1) = L(PX44(ORIGIN)) - L(PX44') \quad \text{[Equation 1]}$$

Here, L(PX44_IM1) is a luminance value of the pixel PX44 measured from the first captured image, L(PX44(ORIGIN)) is the original luminance value of the pixel PX44 that is not measured from the first captured image, and L(PX44') is a value of interference luminance to a periphery which should be measured as a part of the luminance value of the PX44 but is measured as a part of a luminance value of NPX44.

$$L(PX44\_IM\,2) = L(PX44(ORIGIN)) + L(NPX44') - L(PX44')$$ [Equation 2]

Here, L(PX44_IM2) is a luminance value of the pixel PX44 measured from the second captured image, and L(NPX44') is a value of an interference luminance by the periphery which should be measured as a part of the luminance value of a part of the NPX44 but is measured as a part of the luminance value of the PX44.

$$L(PX44\_IM\,3) = L(NPX44')$$ [Equation 3]

Here, L(PX44_IM3) is a luminance value of the pixel PX44 measured from the third captured image.

The control unit 330 may calculate L(PX44(ORIGIN)), L(NPX44'), and L(PX44') through Equations 1 to 3.

The control unit 330 may calculate accurate luminance correction data C_DATA of individual pixels PX based on the calculated L(PX44(ORIGIN)) through Equations 1 to 3.

Figure 17:
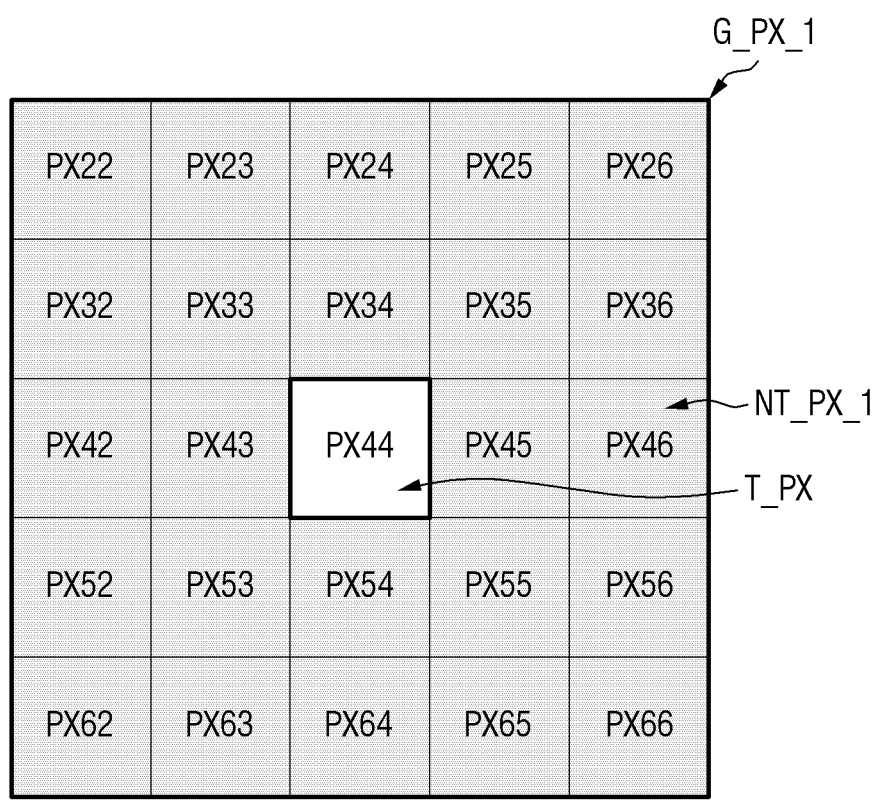
FIG. 17 is a schematic plan view illustrating some of the steps of producing luminance correction data of a target pixel in a method of generating compensation data of a display device according to an embodiment.

FIG. 17 is a schematic plan view illustrating some of the steps of producing luminance correction data of a target pixel in the method of generating compensation data of a display device according to an embodiment.

Referring to FIG. 17, the first non-target pixels NT_PX_1 of the first pixel group G_PX_1 may include all of the first non-target pixels NT_PX of FIG. 8 and the pixels PX adjacent to the first non-target pixels NT_PX of FIG. 8. For example, if the first target pixel T_PX is the pixel PX44, the first non-target pixels NT_PX_1 may include not only pixels PX33, PX34, PX35, PX43, PX45, PX53, PX54, and PX55, but also pixels PX22 to PX26, PX32, PX36, PX42, PX46, PX52, PX56, and PX62 to PX66.

The increase of the number of the first non-target pixels NT_PX_1 according to the embodiment may be considered in case that the individual pixels PX have spots. For example, as described above with reference to FIG. 6, the amount of interference luminance that adjacent pixels PXs have influenced the corresponding pixel PX and the amount of interference luminance that the pixel PX has influenced the adjacent pixels PX may be greater in the outer portion NCR than in the central portion CR around the center point CP, which is a focus of the photographing unit 310. Therefore, the increase of the number of the first non-target pixels NT_PX_1 may be considered in case that more accurate luminance correction data of the pixels PX located in the outer portion NCR should be calculated.

Figure 18:
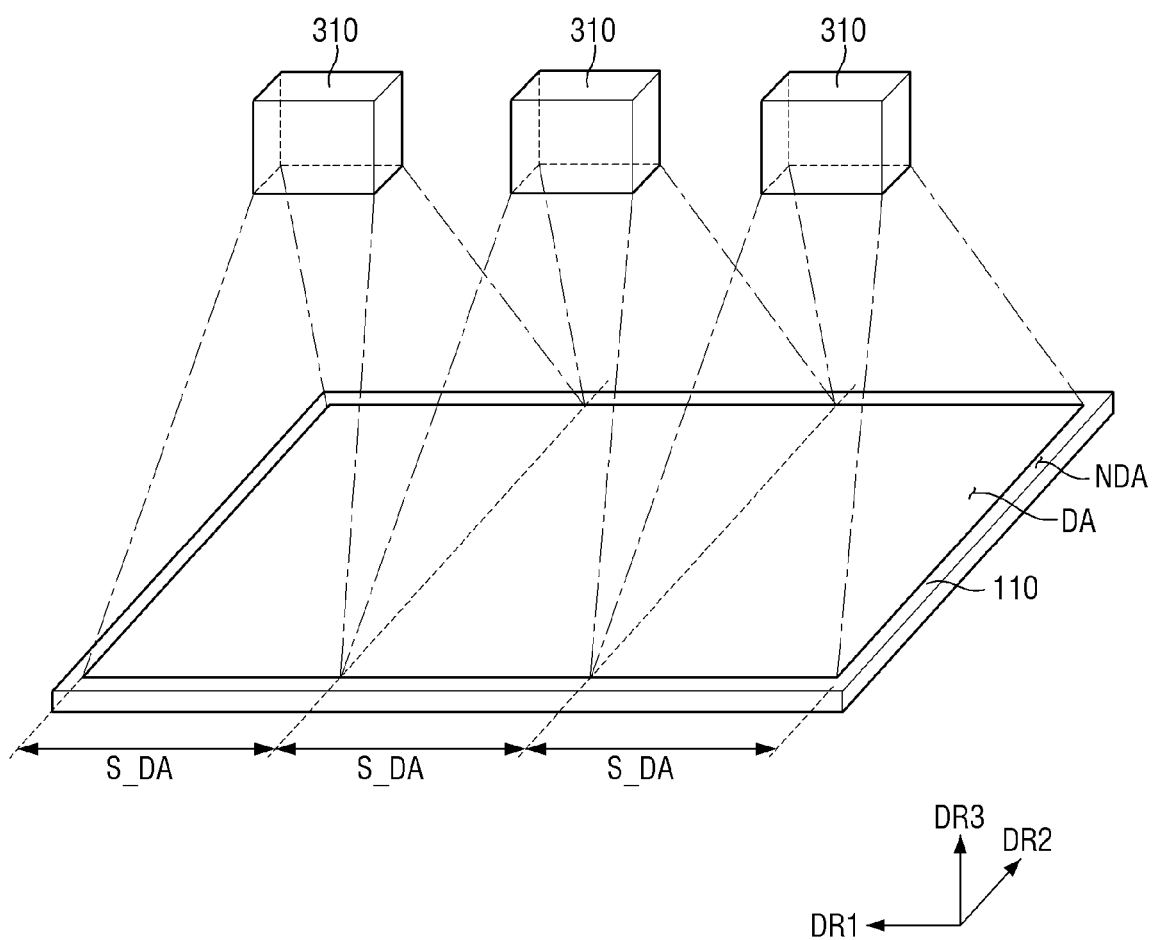
FIG. 18 is a schematic perspective view illustrating the photographing of pixels of a display panel through a photographing unit according to another embodiment.

FIG. 18 is a schematic perspective view illustrating the photographing of pixels of a display panel through a photographing unit according to another embodiment.

Referring to FIG. 18, the embodiment may be different from the apparatus for generating compensation data of the display device according to an embodiment at least in that the display panel 110 is photographed using photographing units 310.

As described above with reference to FIG. 6, in case that the display panel 110 is photographed with the focus of each of the photographing units 310 at the center point CP, the amount of interference luminance that adjacent pixels PXs have influenced the corresponding pixel PX and the amount of interference luminance that the pixel PX has influenced on the adjacent pixels PX may be greater in the outer portion NCR spaced apart from the center point CP, so that spots may be easily recognized. Accordingly, by using multiple photographing units 310 in accordance with the embodiment, it is possible to reduce the visibility of the spots in the outer portion NCR spaced apart from the center point CP.

Figure 19:
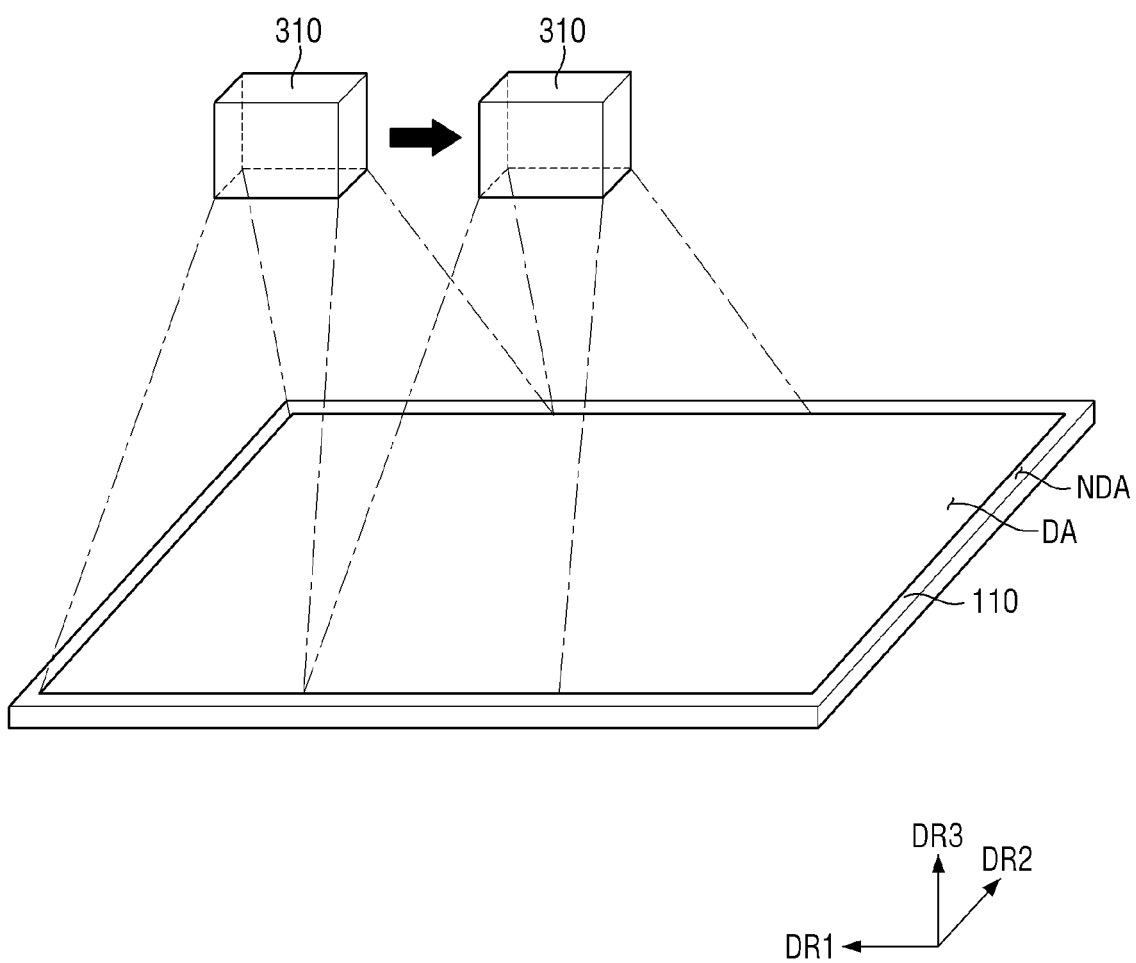
FIG. 19 is a schematic perspective view illustrating the photographing of pixels of a display panel through a photographing unit according to still another embodiment.

FIG. 19 is a schematic perspective view illustrating the photographing of pixels of a display panel through a photographing unit according to still another embodiment.

Referring to FIG. 19, the embodiment may be different from the apparatus for generating compensation data of the display device according to an embodiment at least in that the photographing unit 310 includes a scan camera.

As described above with reference to FIG. 6, in case that the display panel 110 is photographed with the focus of each of the photographing units 310 at the center point CP, the amount of interference luminance that adjacent pixels PXs have influenced the corresponding pixel PX and the amount of interference luminance that the pixel PX has influenced the adjacent pixels PX may be greater in the outer portion NCR spaced apart from the center point CP, so that spots may be easily recognized. Accordingly, by using a scan camera as the photographing unit 310 in accordance with the embodiment, it is possible to reduce the visibility of the spots in the outer portion NCR spaced apart from the center point CP.

According to the method of generating compensation data of a display device and the apparatus for generating compensation data of a display device, accurate luminance correction data can be produced.

The effects of the disclosure are not limited by the foregoing, and other various effects are anticipated herein.

Although the preferred embodiments of the disclosure have been disclosed for illustrative purposes, those skilled in the art will appreciate that various modifications, additions and substitutions are possible, without departing from the scope and spirit of the claimed invention as disclosed in the accompanying claims.

What is claimed is:

1. A method of generating compensation data in a display device, the method comprising:
    setting a pixel group including a first target pixel and first non-target pixels adjacent to the first target pixel among a plurality of pixels of a display panel;
    switching on the first target pixel and switching off the first non-target pixels to generate a first captured image and store the first captured image;
    switching on the first target pixel and the first non-target pixels to generate a second captured image and store the second captured image;
    switching off the first target pixel and switching on the first non-target pixels to generate a third captured image and store the third captured image; and
    calculating luminance correction data of the first target pixel based on the stored first to third captured images.

2. The method of claim 1, wherein the first non-target pixels include pixels contacting the first target pixel.

3. The method of claim 2, wherein
    the calculating of the luminance correction data of the first target pixel based on the stored first to third captured images includes calculating Equation 1 based on the first captured image, and
    the Equation 1 is defined as L(PXpq_IM1)=L(PXpq(ORIGIN))−L(PXpq'), wherein
        the PXpq is a pixel disposed at a p-th row and a q-th column of the plurality of pixels of the display panel, the p and q being natural numbers,
        the L(PXpq_IM1) is a luminance value of the PXpq measured from the first captured image,
        the L(PXpq(ORIGIN)) is an original luminance value of the PXpq that is not measured from the first captured image, the L(PXpq') is a value of interference luminance to a periphery which should be measured as a part of the luminance value of the PXpq but is measured as a part of a luminance value of NPXpq, and the NPXpq are pixels adjacent to the PXpq.

4. The method of claim 3, wherein the calculating of the luminance correction data of the first target pixel based on the stored first to third captured images includes calculating Equation 2 based on the second captured image, and the Equation 2 is defined as L(PXpq_IM2)=L(PXpq(ORIGIN))+L(NPXpq')−L(PXpq'), wherein the L(PXpq_IM2) is a luminance value of the PXpq measured from the second captured image, and the L(NPXpq') is a value of an interference luminance by the periphery which should be measured as a part of the luminance value of the NPXpq but is measured as a part of the luminance value of the PXpq.

5. The method of claim 4, wherein the calculating of the luminance correction data of the first target pixel based on the stored first to third captured images includes calculating Equation 3 based on the third captured image, and the Equation 3 is defined as L(PXpq_IM3)=L(NPXpq'), wherein the L(PXpq_IM3) is a luminance value of the PXpq measured from the third captured image).

6. The method of claim 5, wherein the L(PXpq(ORIGIN)), L(NPXpq'), and L(PXpq') are calculated through the Equations 1 to 3.

7. The method of claim 6, wherein the luminance correction data of the first target pixel is calculated based on the calculated L(PXpq(ORIGIN)).

8. The method of claim 7, further comprising:

setting one of the first non-target pixels as a second target pixel and setting pixels contacting the second target pixel as second non-target pixels, between the switching off of the first target pixel and switching on the first non-target pixels and the calculating of the luminance correction data of the first target pixel.

9. The method of claim 1, wherein the display panel includes an inorganic light emitting diode.

10. The method of claim 1, wherein the first to third captured images are generated by a CMOS camera or a CCD camera.

11. The method of claim 10, wherein the CMOS camera represents relative luminance of the plurality of pixels.

12. An apparatus for generating compensation data in a display device, the apparatus comprising:

a display panel including a plurality of pixels, the plurality of pixels including a pixel group, the pixel group including a first target pixel and first non-target pixels adjacent to the first target pixel;

an image capturing device generating a first captured image obtained by switching on the first target pixel and switching off the first non-target pixels, a second captured image obtained by switching on the first target pixel and the first non-target pixels, and a third captured image obtained by switching off the first target pixel and switching on the first non-target pixels;

a storage device storing a first captured image obtained by switching on the first target pixel and switching off the first non-target pixels, a second captured image obtained by switching on the first target pixel and the first non-target pixels, and a third captured image obtained by switching off the first target pixel and switching on the first non-target pixels; and a controller calculating luminance correction data of the first target pixel based on the first captured image to the third captured image.

13. The apparatus of claim 12, wherein the first non-target pixels include pixels contacting the first target pixel.

14. The apparatus of claim 13, wherein the controller calculates Equation 1 based on the first captured image, and the Equation 1 is defined as L(PXpq_IM1)=L(PXpq(ORIGIN))−L(PXpq'), wherein the PXpq is a pixel disposed at a p-th row and a q-th column of the plurality of pixels of the display panel, the p and q being natural numbers, the L(PXpq_IM1) is a luminance value of the PXpq measured from the first captured image, the L(PXpq(ORIGIN)) is an original luminance value of the PXpq that is not measured from the first captured image, the L(PXpq') is a value of interference luminance to a periphery which should be measured as a part of the luminance value of the PXpq but is measured as a part of a luminance value of NPXpq, and the NPXpq are pixels adjacent to the PXpq.

15. The apparatus of claim 14, wherein the controller calculates Equation 2 based on the second captured image, and the Equation 2 is defined as L(PXpq_IM2)=L(PXpq(ORIGIN))+L(NPXpq')−L(PXpq'), wherein the L(PXpq_IM2) is a luminance value of the PXpq measured from the second captured image, and the L(NPXpq') is a value of an interference luminance by the periphery which should be measured as a part of the luminance value of the NPXpq but is measured as a part of the luminance value of the PXpq.

16. The apparatus of claim 15, wherein the controller calculates Equation 3 based on the third captured image, and the Equation 3 is defined as L(PXpq_IM3)=L(NPXpq'), wherein the L(PXpq_IM3 is a luminance value of the pixel PXpq measured from the third captured image).

17. The apparatus of claim 16, wherein the controller calculates the L(PXpq(ORIGIN)), L(NPXpq'), and L(PXpq') through Equations 1 to 3.

18. The apparatus of claim 17, wherein the controller calculates the luminance correction data of the first target pixel based on the calculated L(PXpq(ORIGIN)).

19. The apparatus of claim 12, wherein the display panel includes an inorganic light emitting diode.

20. The apparatus of claim 12, wherein the first captured to third captured images are generated by a CMOS camera or a CCD camera, and the CMOS camera represents relative luminance of the plurality of pixels.

* * * * *